(12) United States Patent
Kramer

(10) Patent No.: US 10,906,757 B2
(45) Date of Patent: Feb. 2, 2021

(54) MODULE FOR A CONVEYOR SYSTEM FOR BULK GOODS, AND ALSO CONVEYOR SYSTEM FOR BULK GOODS

(71) Applicant: Walter Kramer, Hünenberg See (CH)

(72) Inventor: Walter Kramer, Hünenberg See (CH)

( * ) Notice: Subject to any disclaimer, the term of this patent is extended or adjusted under 35 U.S.C. 154(b) by 0 days.

(21) Appl. No.: 16/461,394

(22) PCT Filed: Jan. 11, 2018

(86) PCT No.: PCT/EP2018/000015
§ 371 (c)(1),
(2) Date: May 16, 2019

(87) PCT Pub. No.: WO2018/130425
PCT Pub. Date: Jul. 19, 2018

(65) Prior Publication Data
US 2020/0055679 A1 Feb. 20, 2020

(30) Foreign Application Priority Data
Jan. 11, 2017 (DE) .................. 10 2017 000 423

(51) Int. Cl.
*B65G 53/56* (2006.01)
*B65G 53/04* (2006.01)

(52) U.S. Cl.
CPC ............ *B65G 53/56* (2013.01); *B65G 53/04* (2013.01); *B65G 2201/04* (2013.01); *B65G 2812/1608* (2013.01)

(58) Field of Classification Search
CPC ....... B65G 53/56; B65G 53/528; B65G 51/24
See application file for complete search history.

(56) References Cited

U.S. PATENT DOCUMENTS

| | | | |
|---|---|---|---|
| 2,752,944 A | 3/1953 | Temple | |
| 2,639,196 A * | 5/1953 | Glaza | B65G 53/56 406/182 |
| 2,858,851 A | 9/1954 | Holl | |
| 2,895,768 A | 9/1957 | Bray, Jr. | |
| 5,094,011 A | 3/1992 | Graff et al. | |
| 5,165,826 A * | 11/1992 | Egbert | B65G 51/24 406/182 |
| 2016/0176657 A1 | 6/2016 | Kramer | |

FOREIGN PATENT DOCUMENTS

| | | |
|---|---|---|
| CN | 102 818 047 | 12/2012 |
| CN | 204473885 | 7/2015 |
| DE | 3730041 | 3/1989 |
| DE | 298 10 901 | 11/1999 |
| DE | 20 2012 101 232 | 6/2012 |
| DE | 10 2013 012 868 | 1/2015 |
| EP | 0 416 475 | 3/1991 |
| GB | 413 219 | 7/1934 |
| JP | 2012 197856 | 10/2012 |

* cited by examiner

*Primary Examiner* — William R Harp
(74) *Attorney, Agent, or Firm* — Gudrun E. Huckett

(57) ABSTRACT

The module (19) for a conveyor system for bulk goods has at least one first tubular section (20). A second tubular section (23), which is provided with at least one coupling piece (21), branches away from said first tubular section. The second tubular section (23) adjoins a valve (13) which has three connections (25, 26). The first connection forms a flow-connection with the second tubular section (23). The second connection (26) of the valve (13) can be selectively connected to the first connection (25) by means of a first line and to the third connection (25) by means of a second line (48).

19 Claims, 28 Drawing Sheets

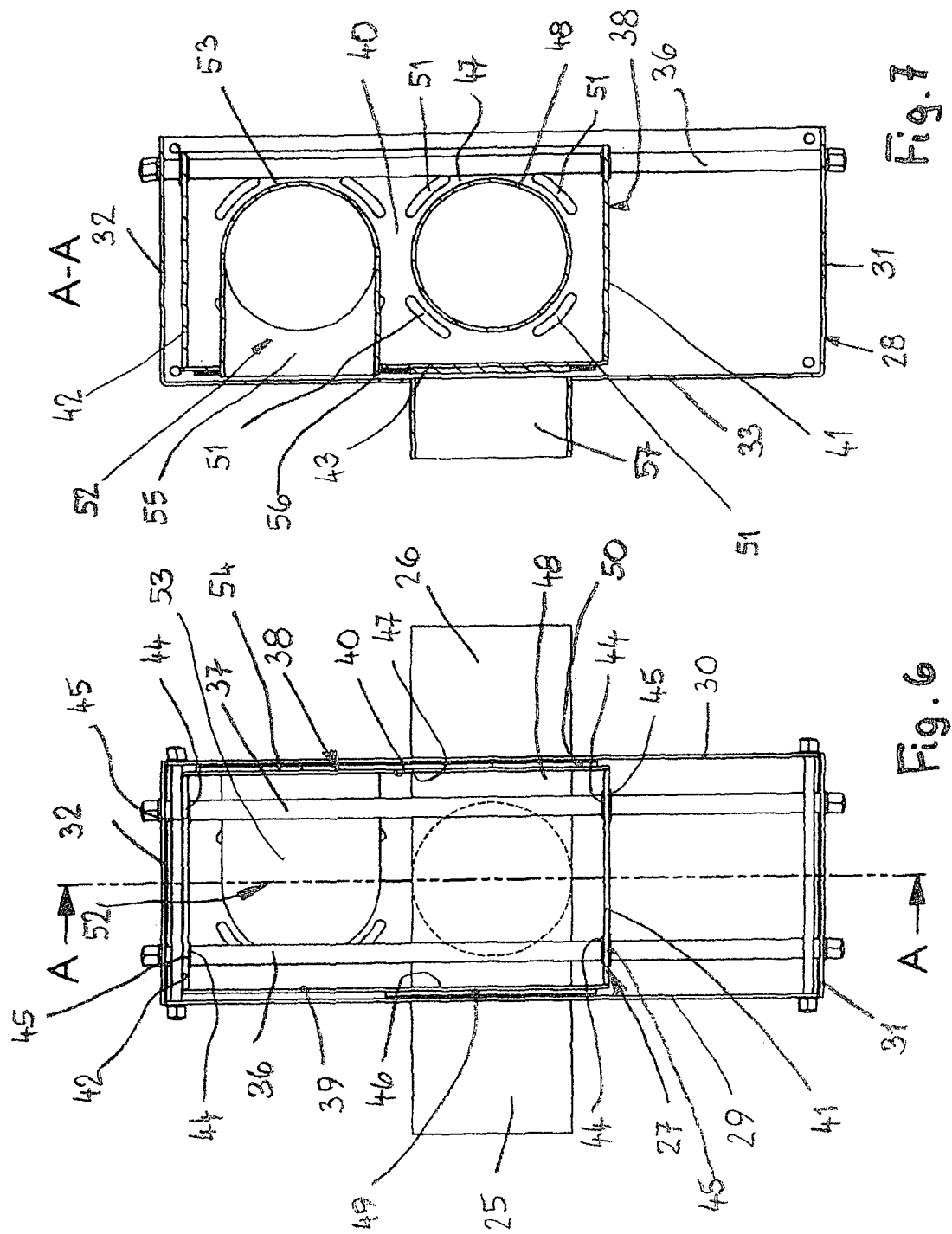

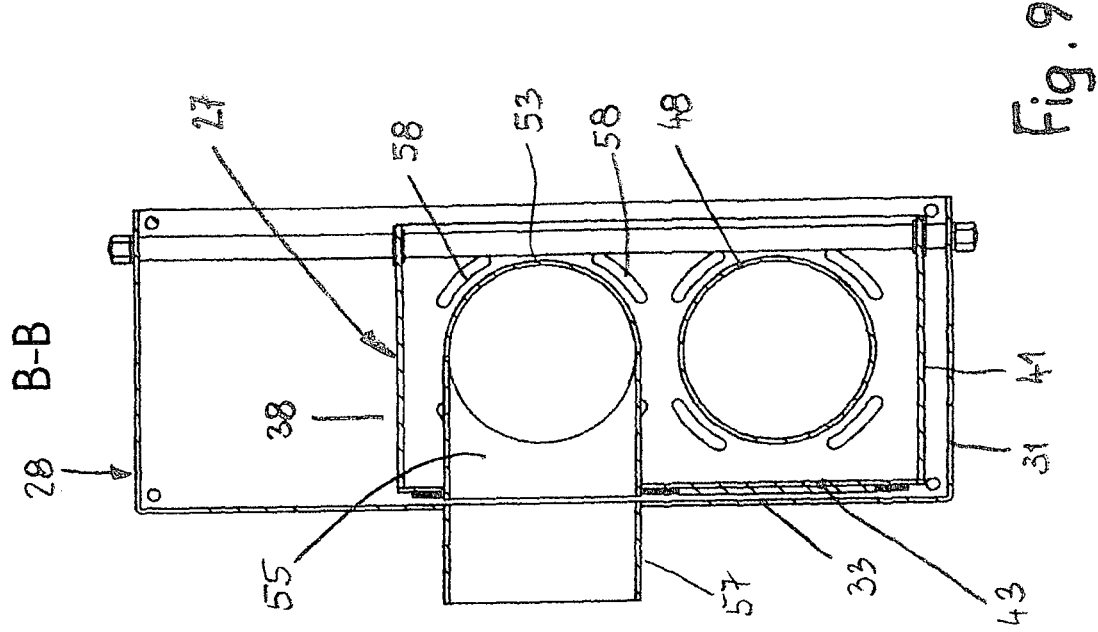
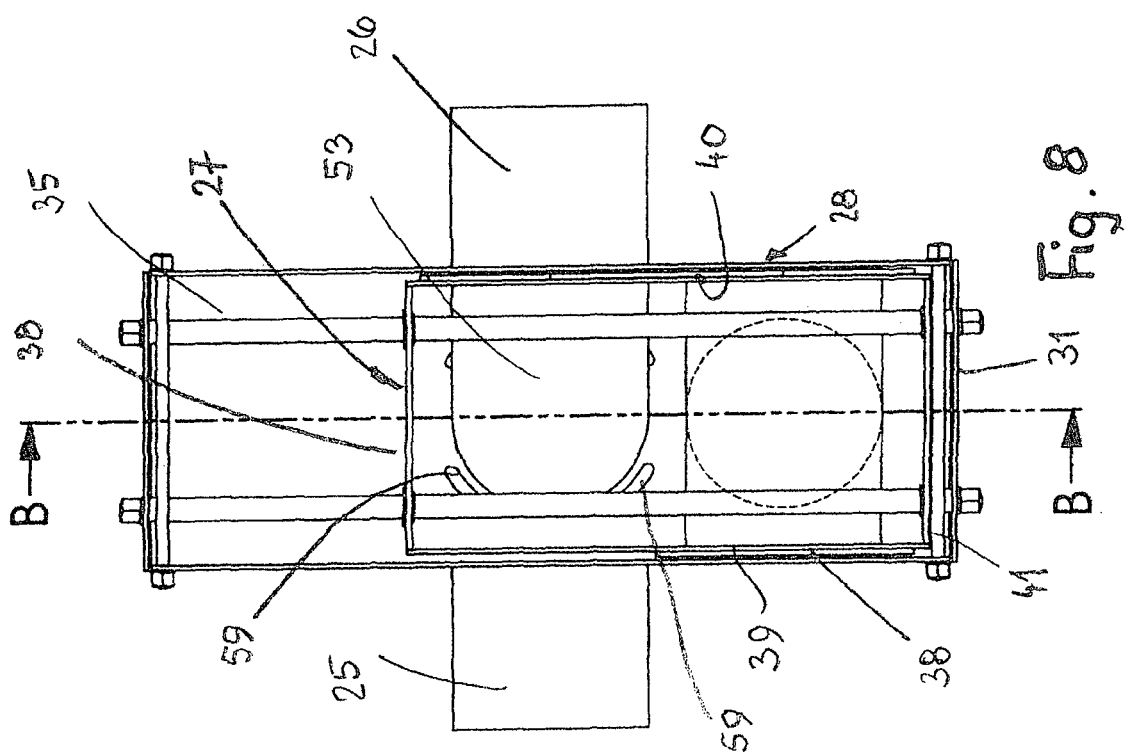

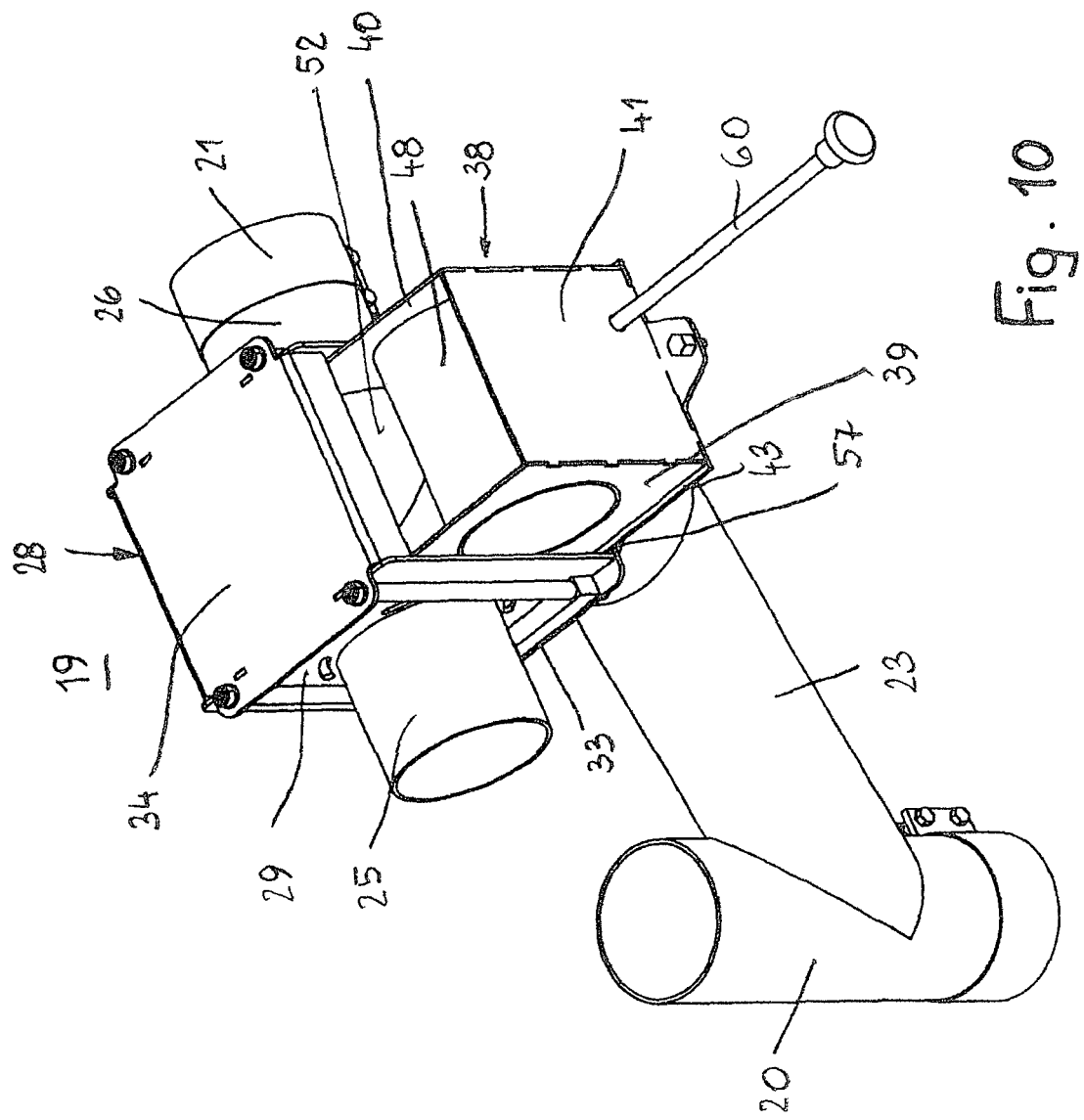

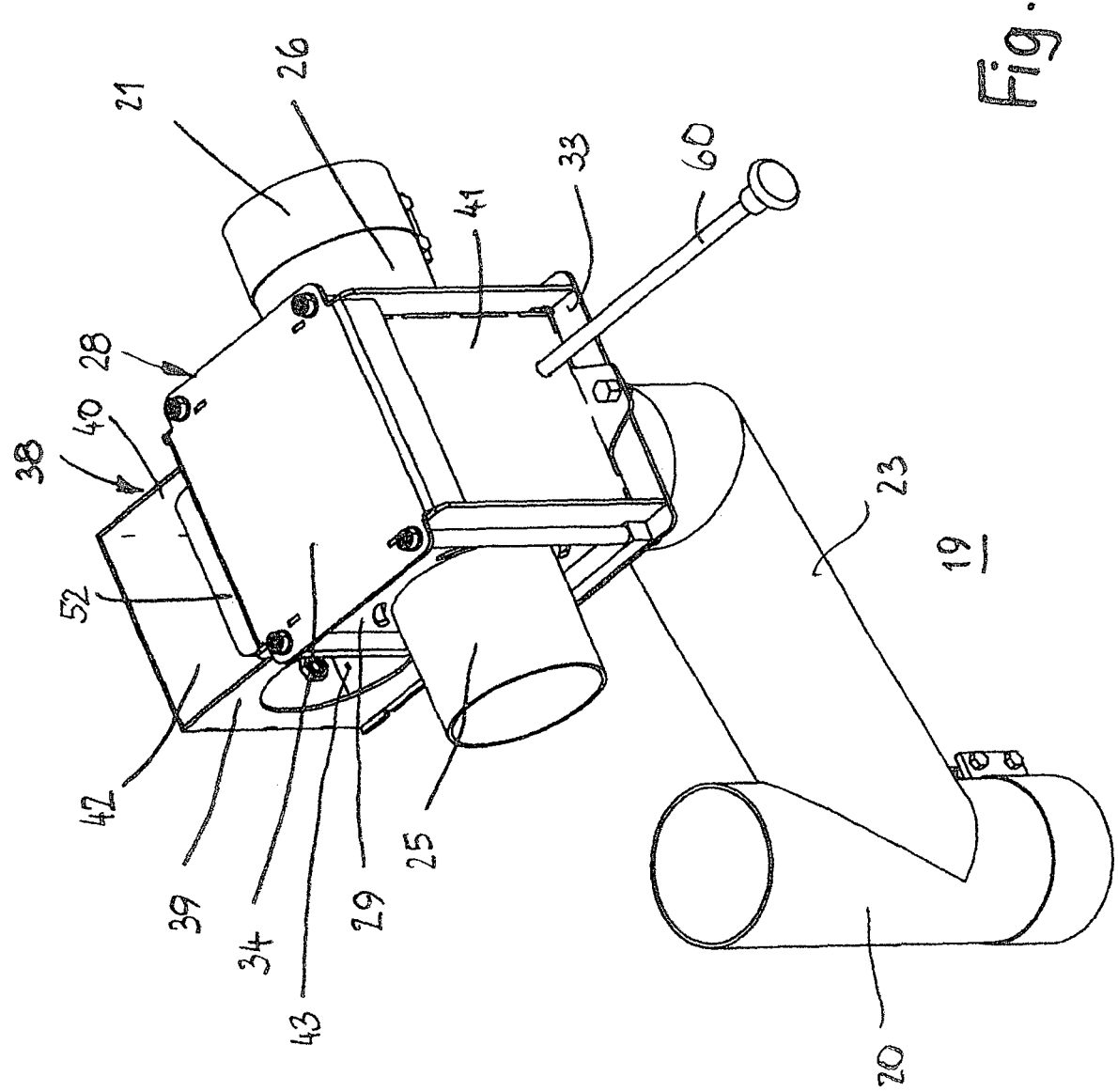

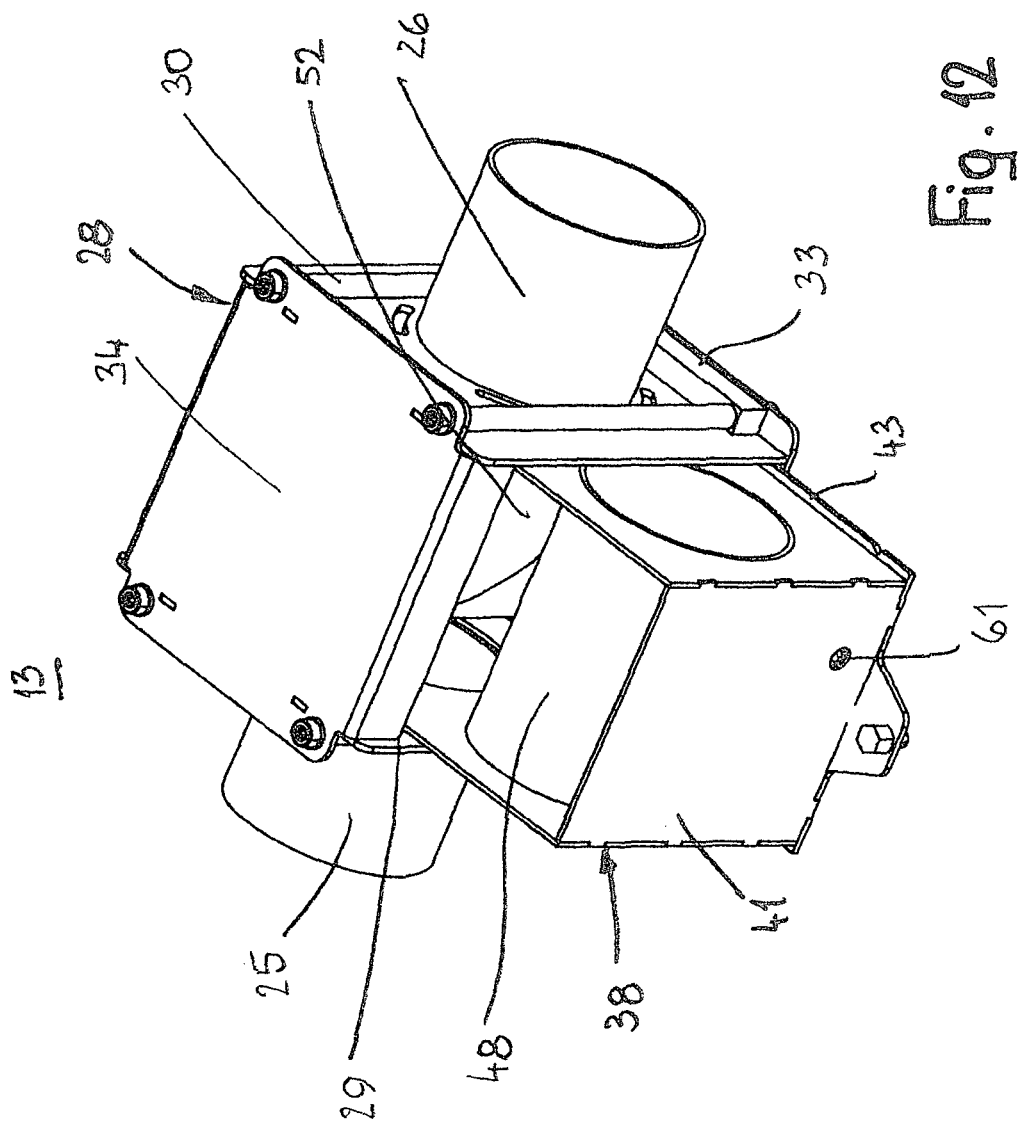

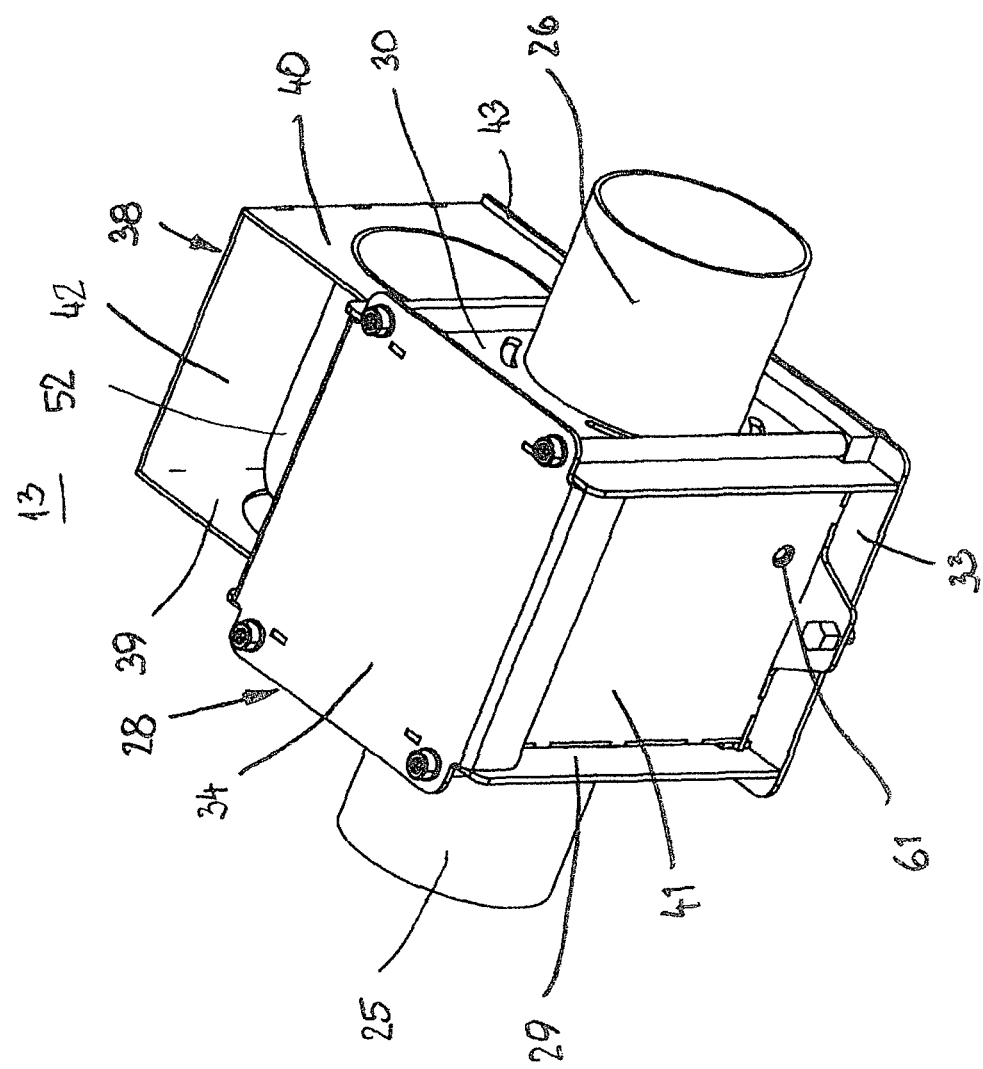

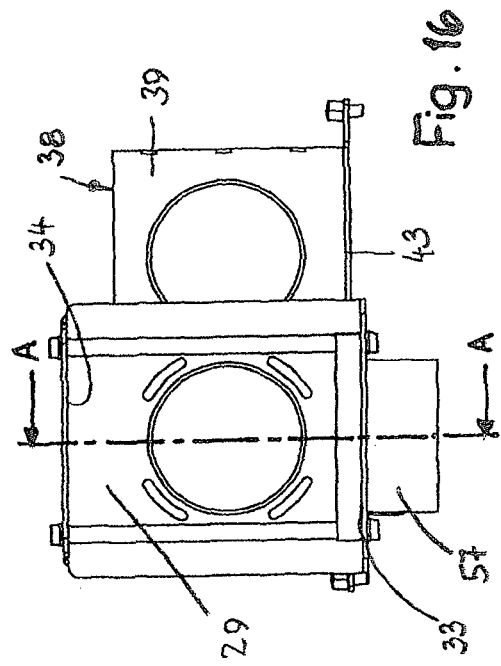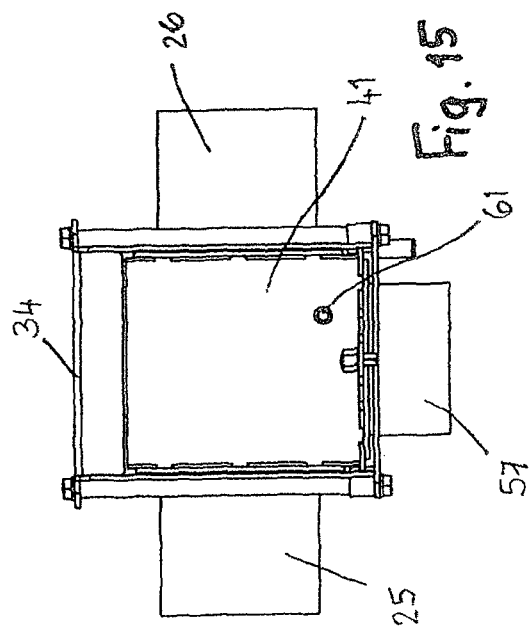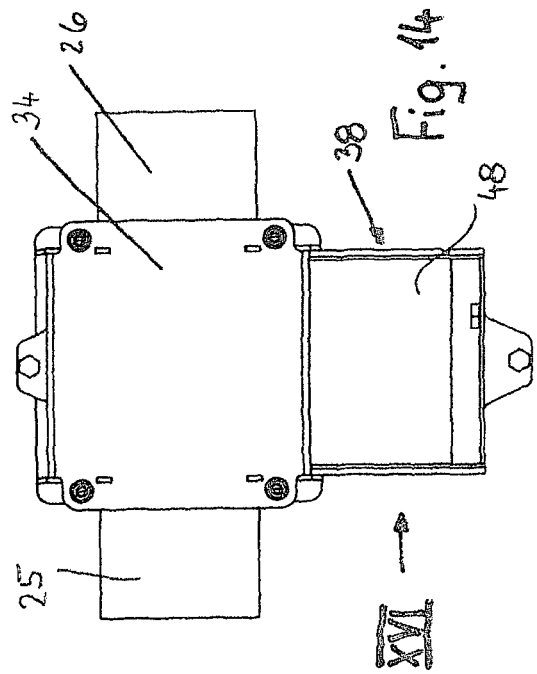

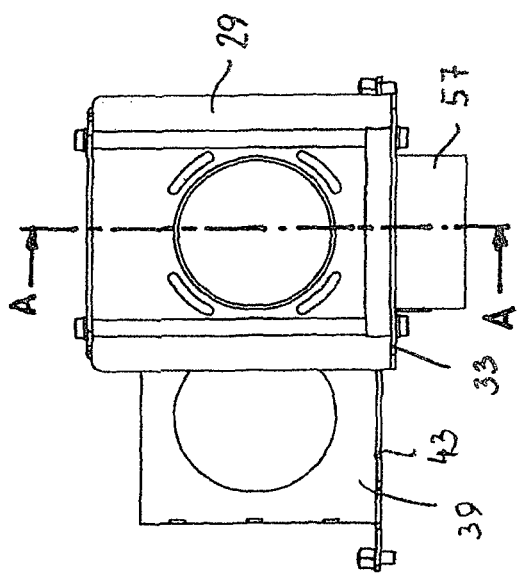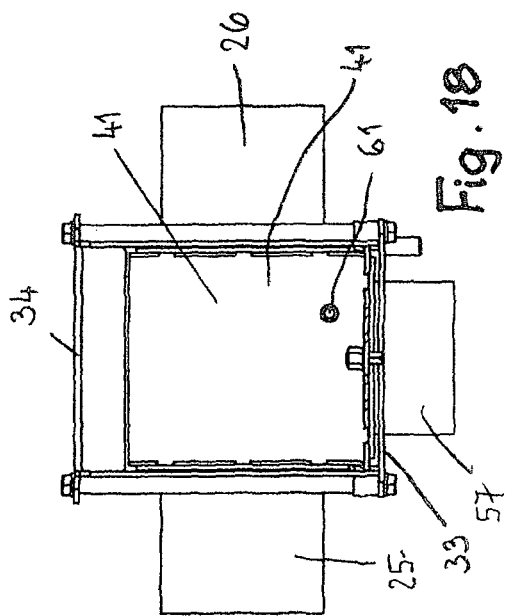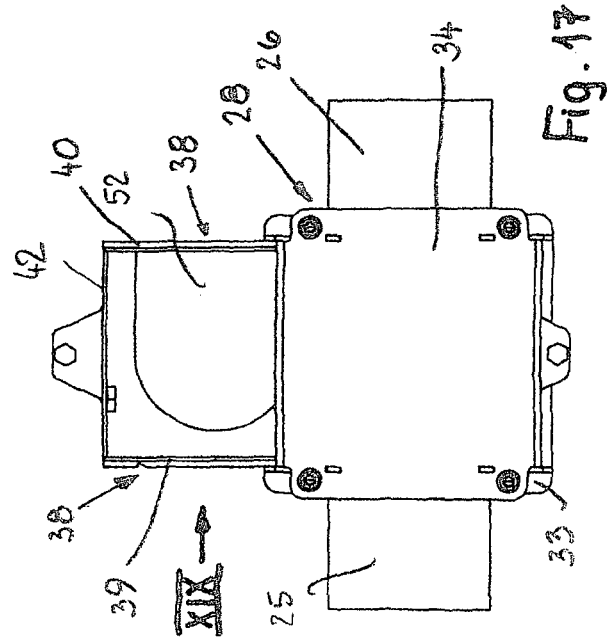

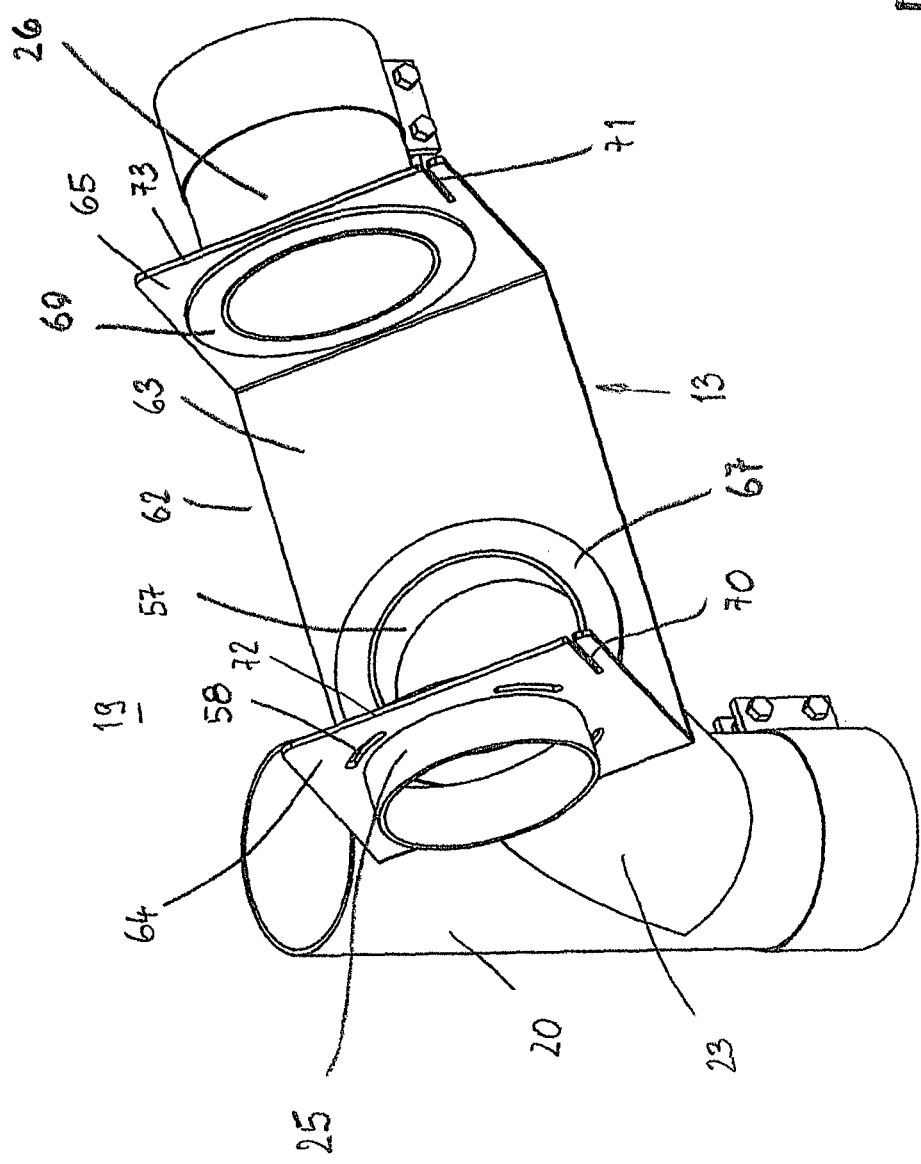

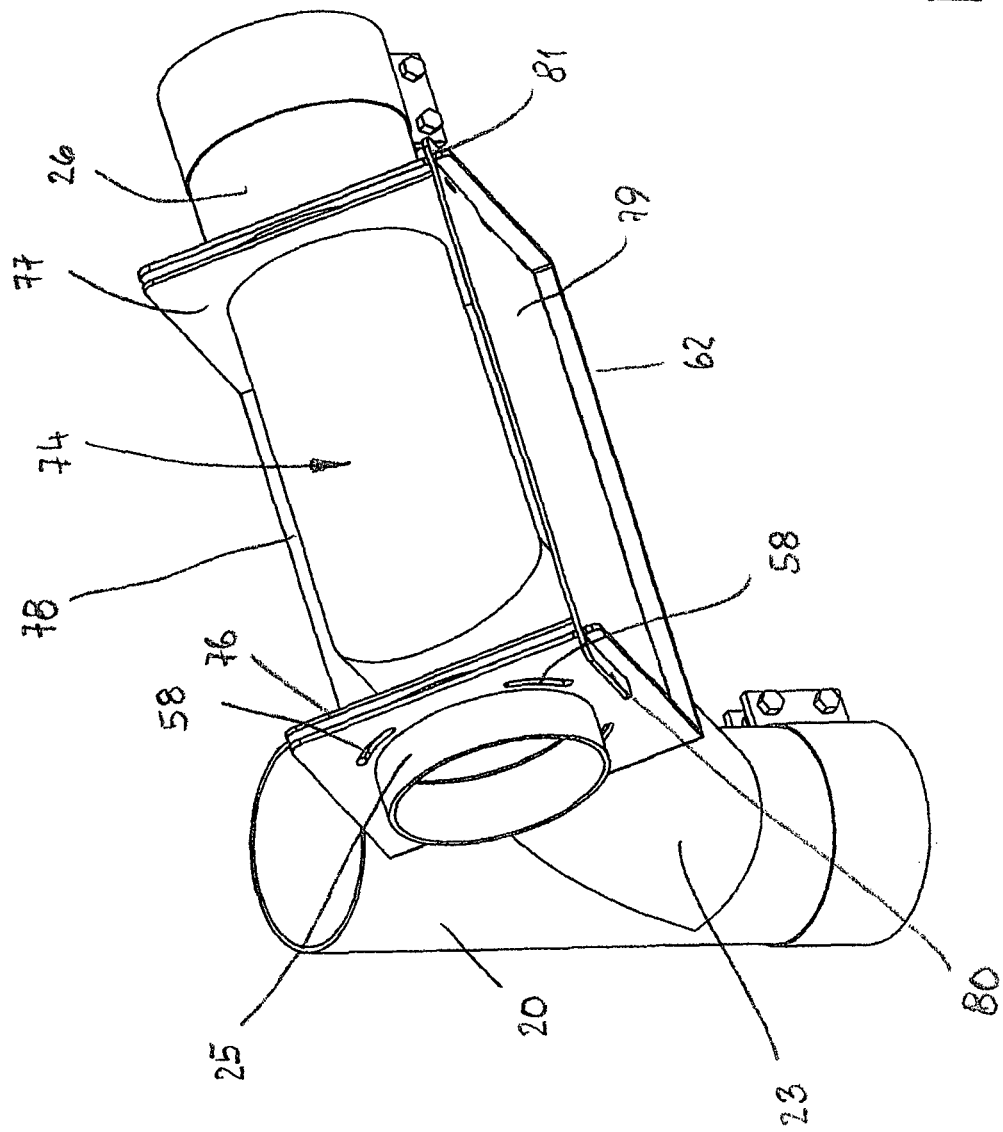

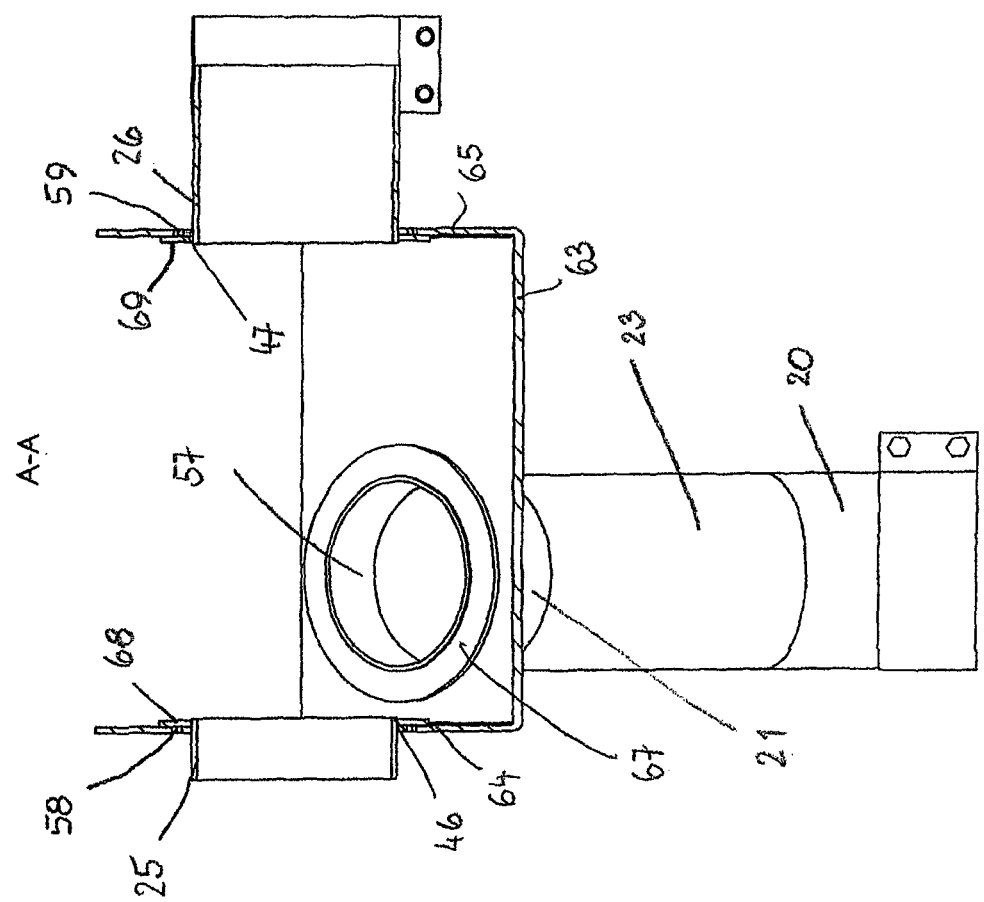
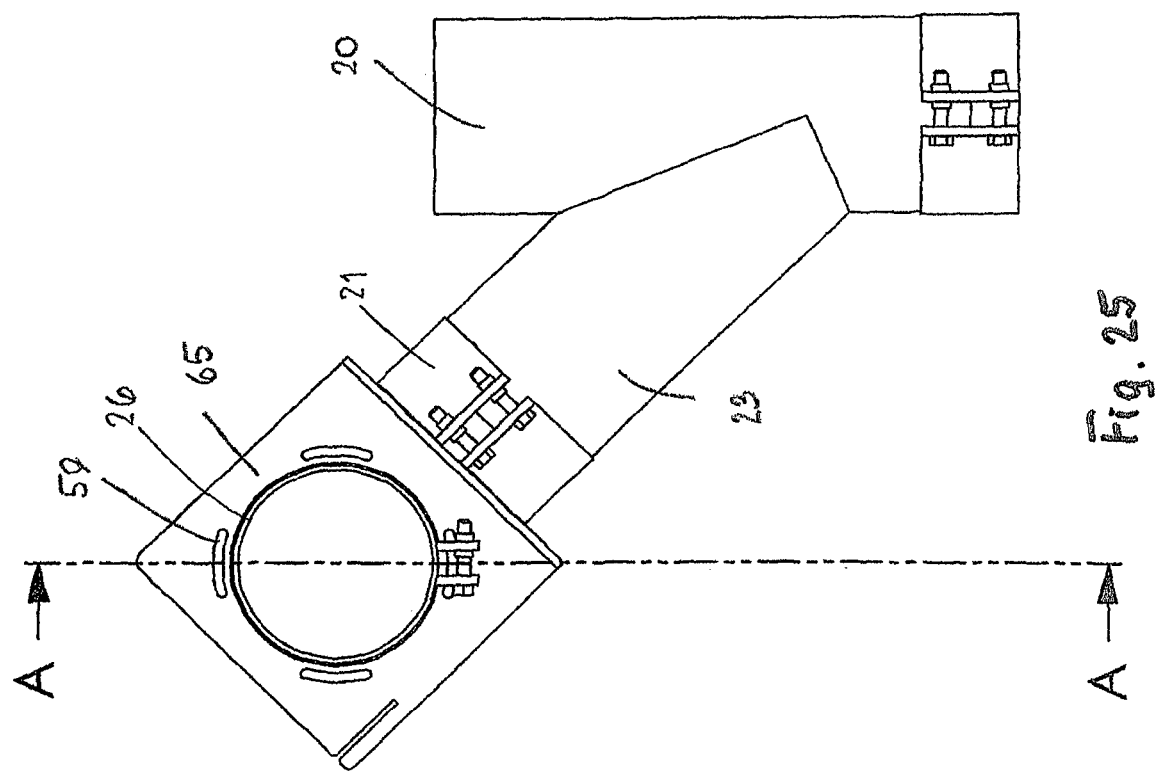
Fig. 25

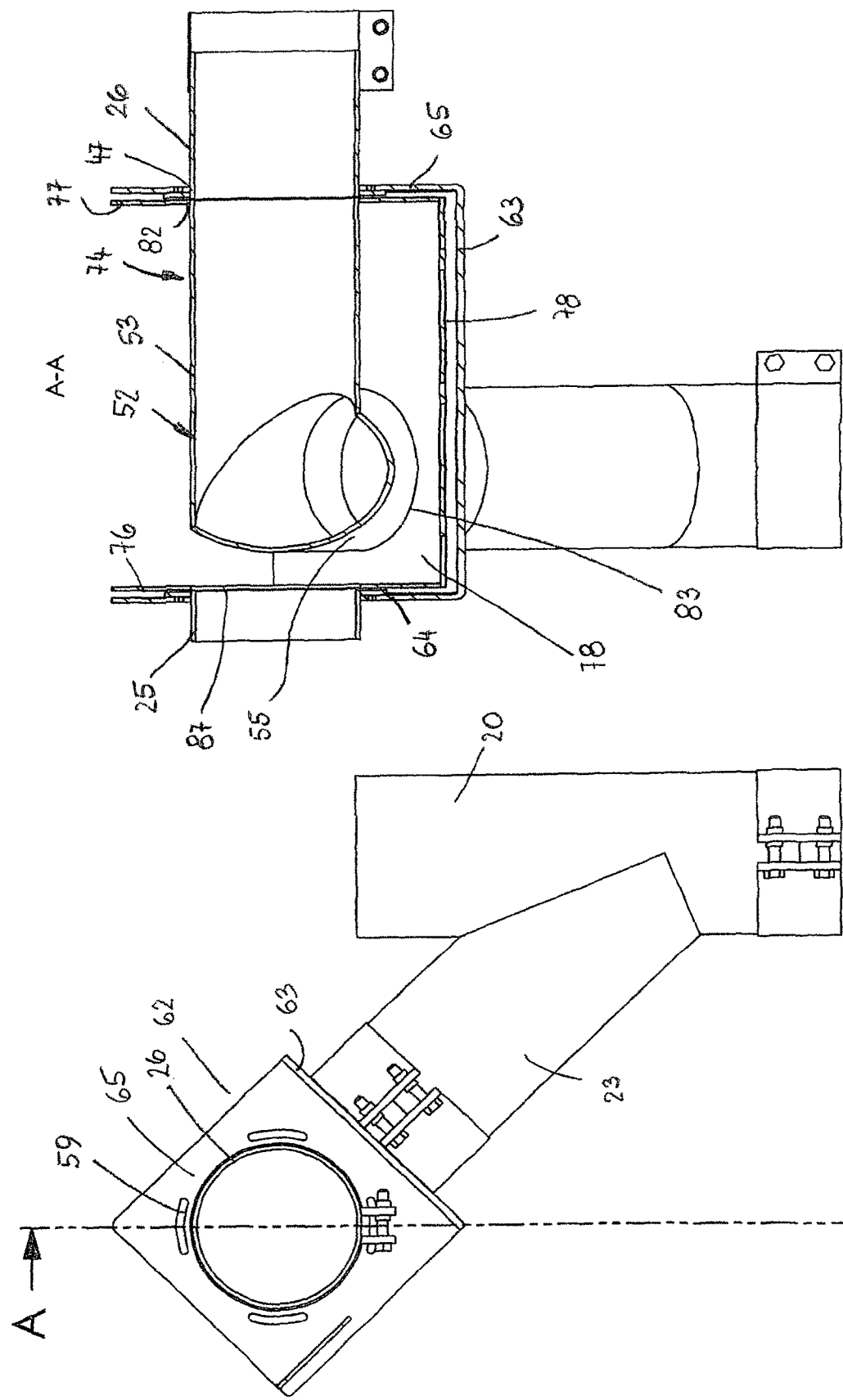

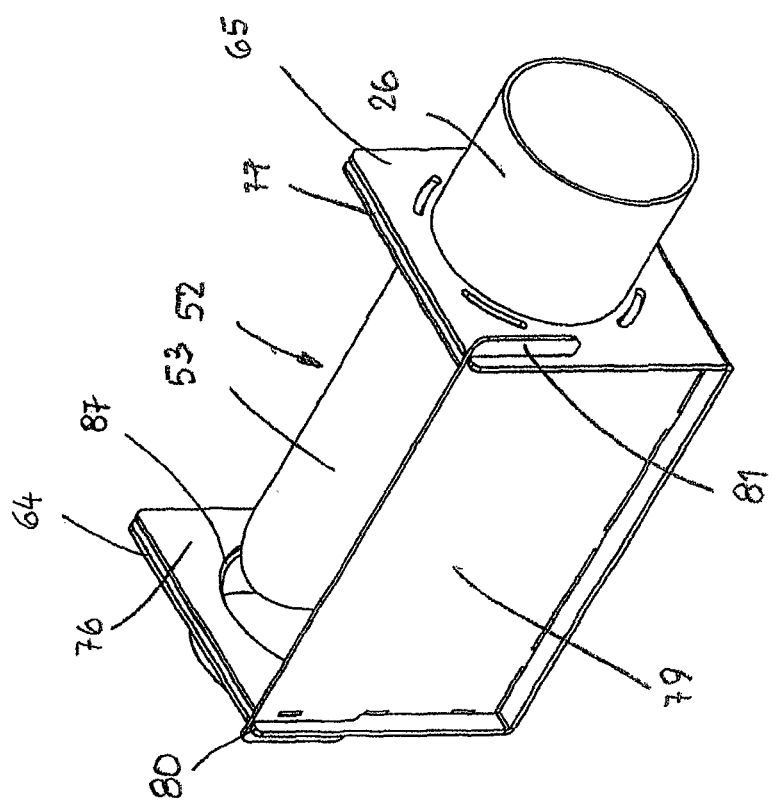
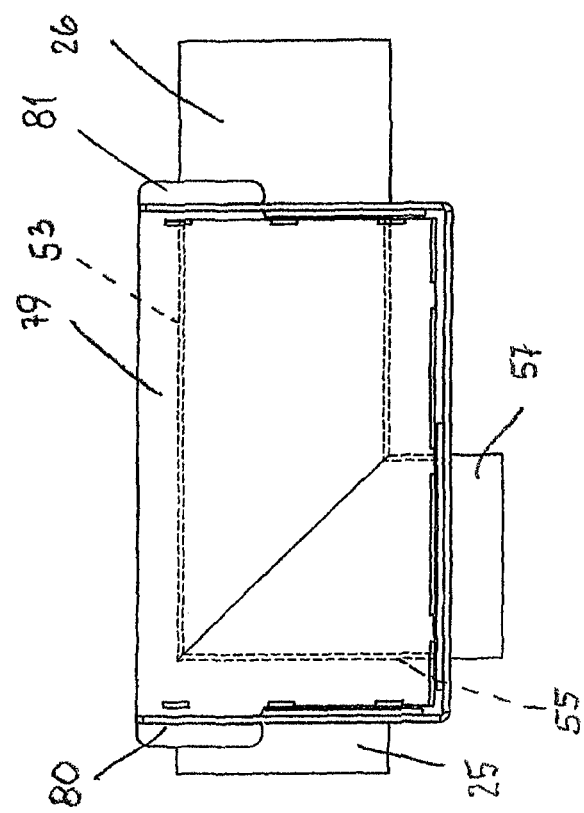

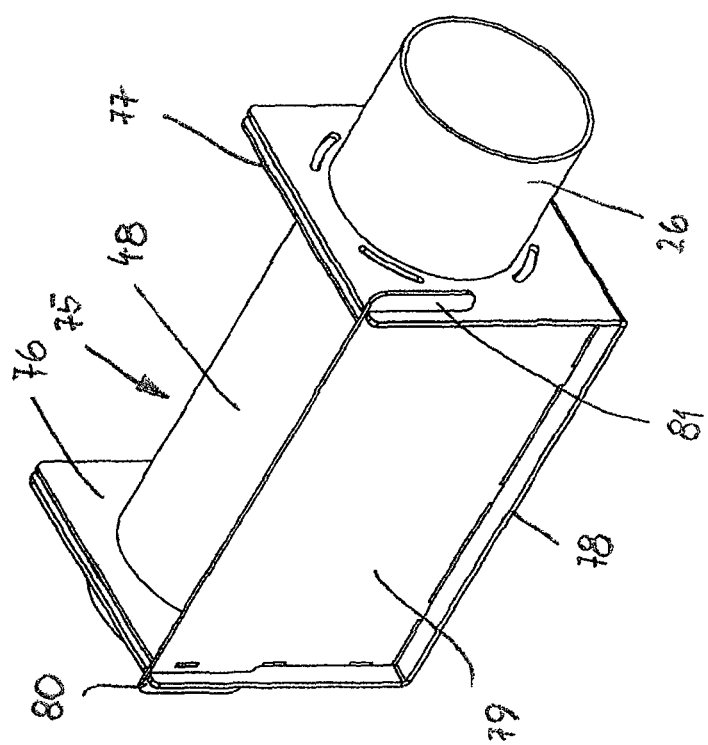
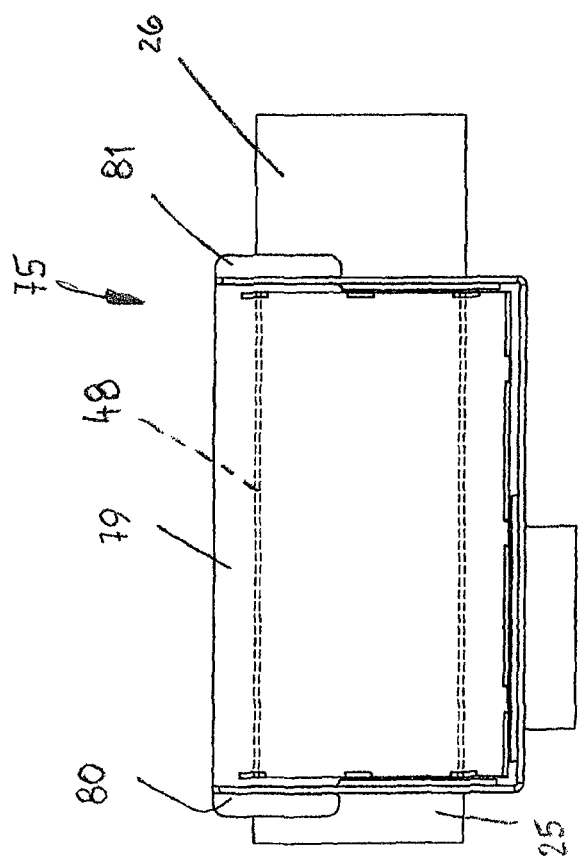

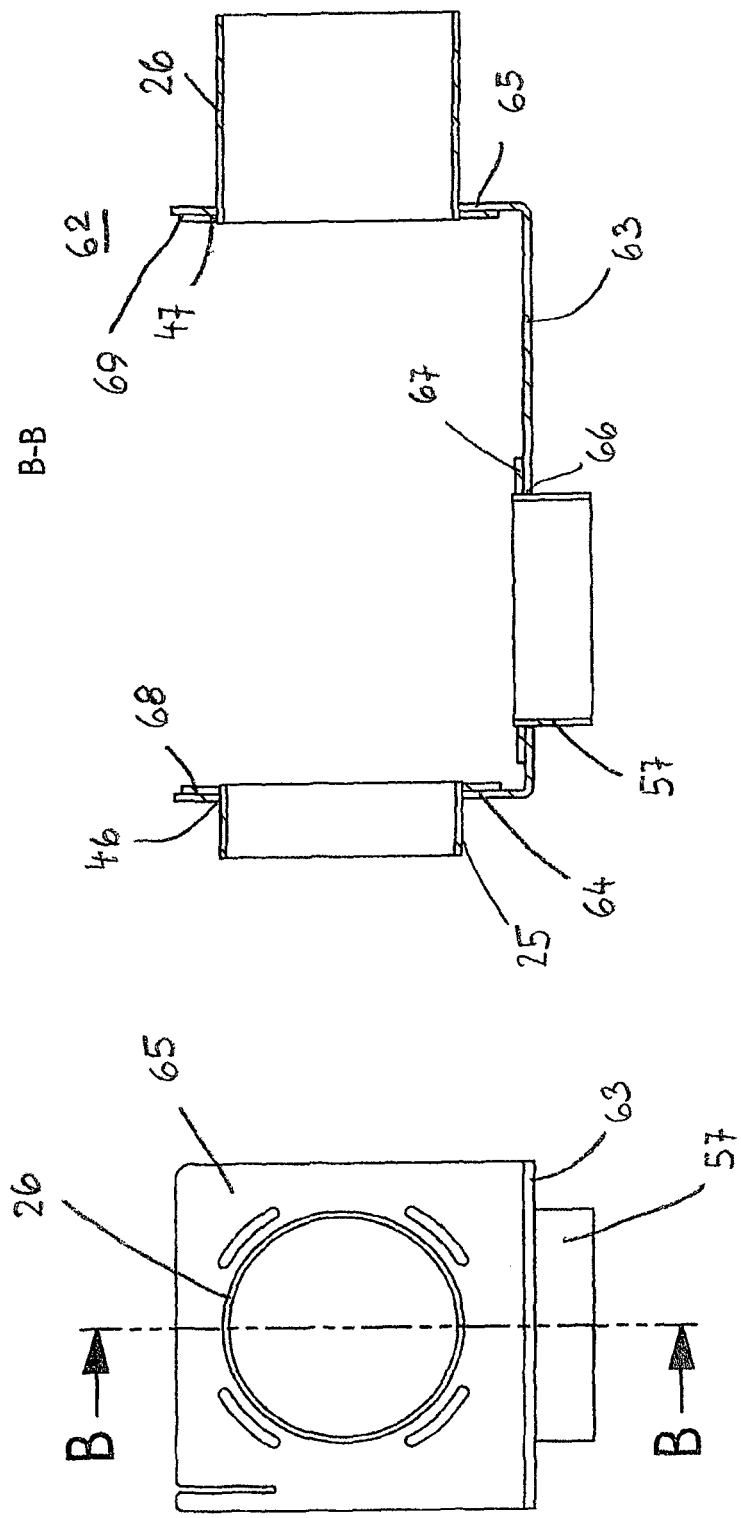

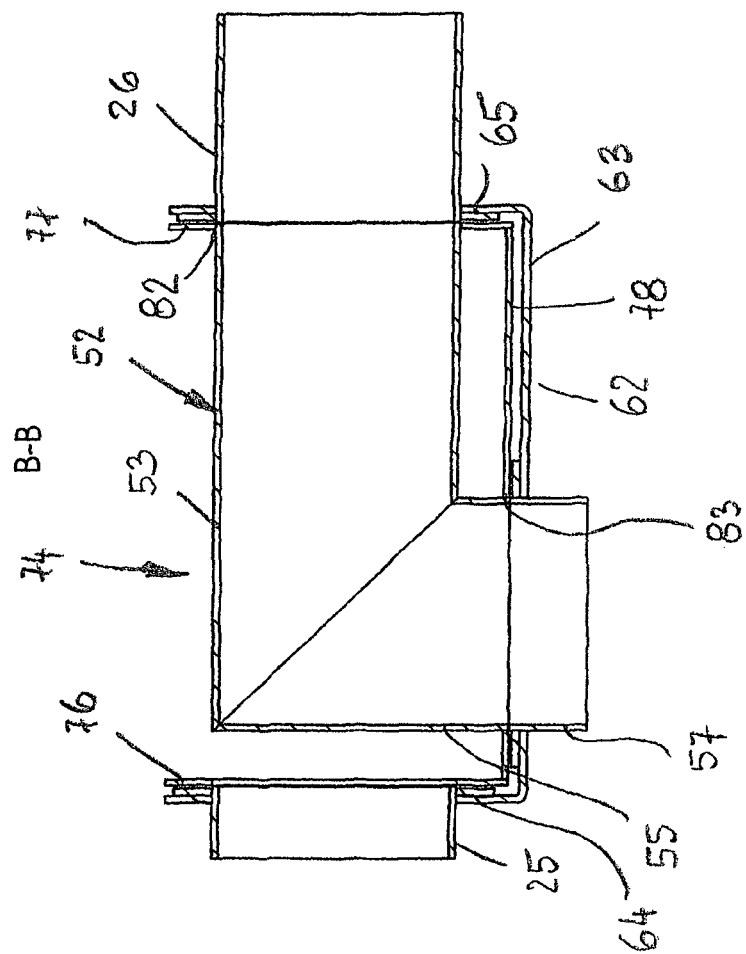
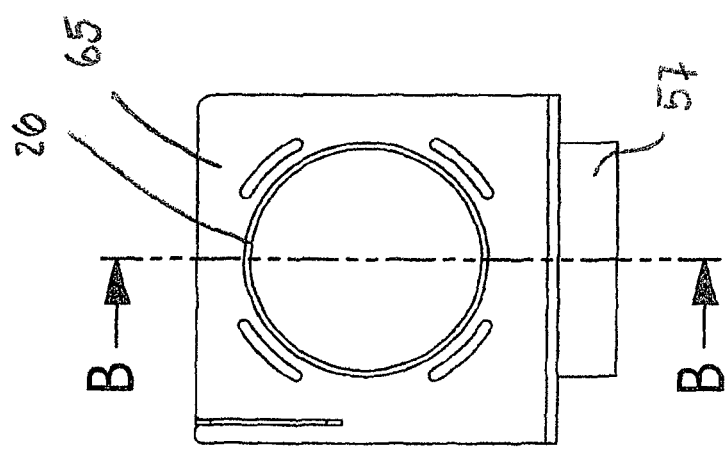

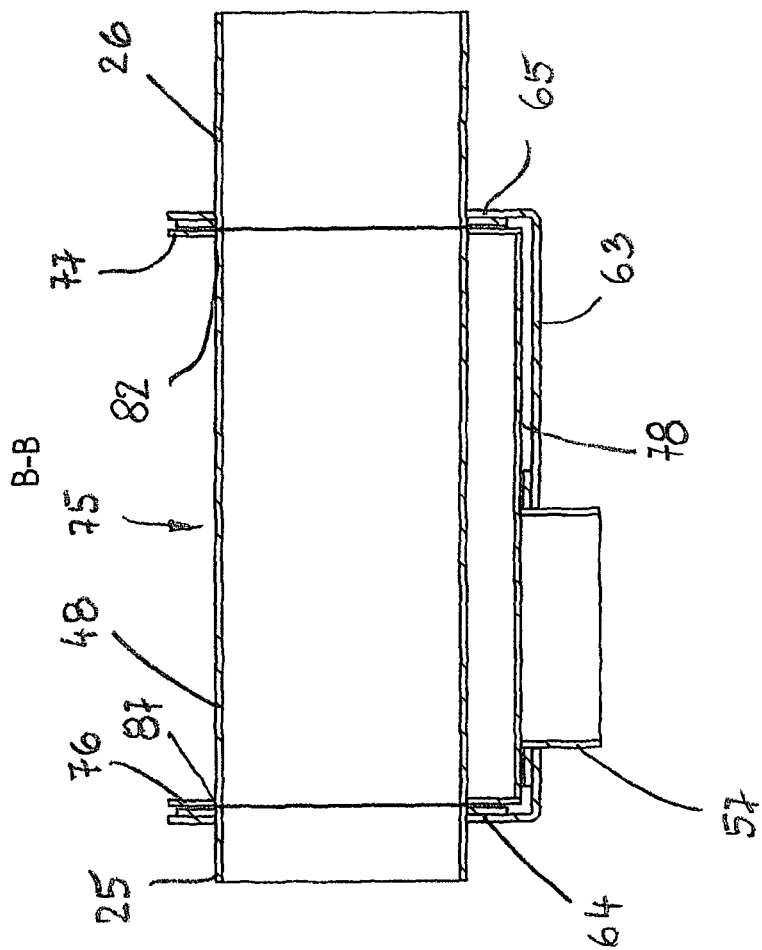
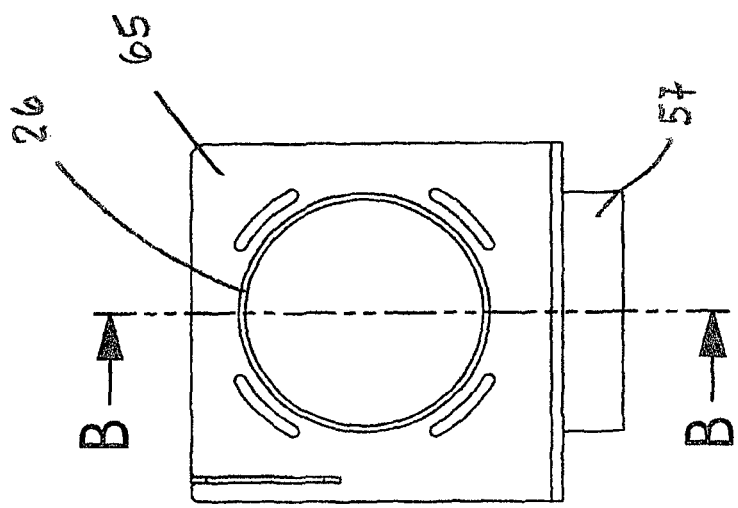

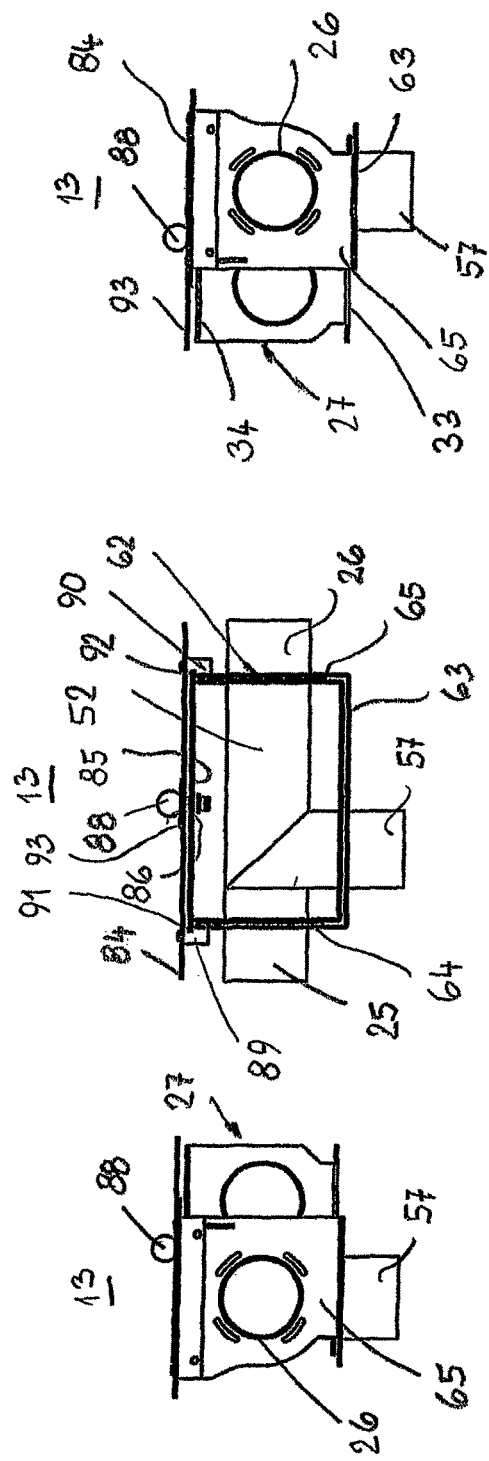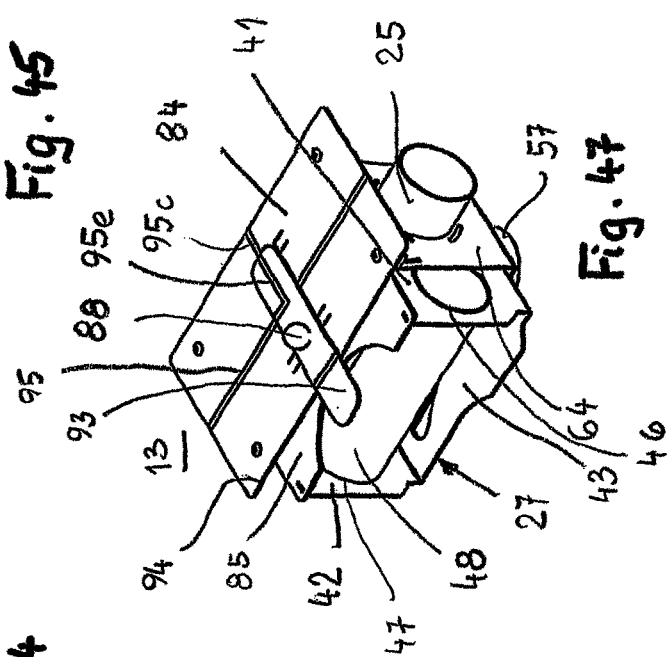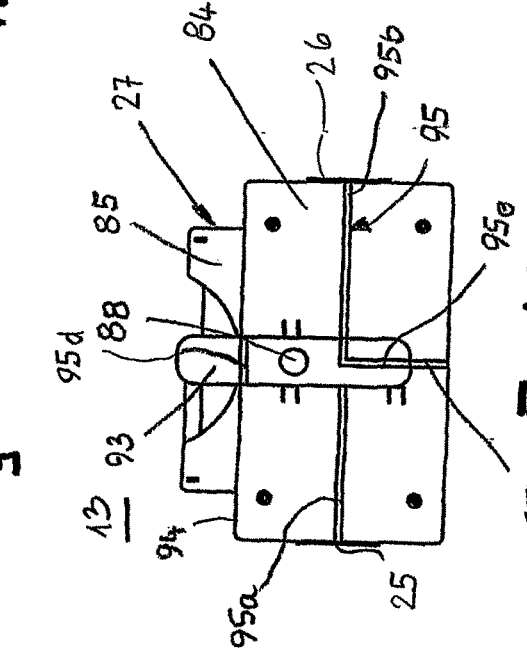

MODULE FOR A CONVEYOR SYSTEM FOR BULK GOODS, AND ALSO CONVEYOR SYSTEM FOR BULK GOODS

BACKGROUND OF THE INVENTION

The invention concerns a module for a conveyor system for bulk goods, comprising at least one first tubular section from which a second tubular section branches off which is provided with at least one coupling piece, and also a conveyor system for bulk goods, comprising at least two senders which are connectable by a line connection via a matrix station to at least one consumer.

Bulk goods, for example, plastic granules, are pneumatically conveyed by conveyor systems from the sender to the consumer. The sender, for example, a silo, stores the bulk goods to be conveyed. The receivers, such as separating containers or processing machines, process the bulk goods conveyed from the sender. The senders of the conveyor system can store different bulk goods. By means of a matrix station that is arranged between the senders and the consumers the required type of bulk goods is supplied to the consumer. The matrix station is comprised of individual modules that are assembled to the matrix station. Each module has a first tubular section from which a second tubular section branches off. It is provided with a coupling piece with which the second tubular section is connected to a blocking element. With it, the passage for the bulk goods can be opened or closed. These blocking elements are constructively very complex and expensive. Since the matrix station in general comprises a plurality of such modules and blocking elements, purchasing the conveyor system and also the individual module is correspondingly expensive.

The invention has the object to configure the module of the aforementioned kind and the conveyor system of the aforementioned kind such that they can be embodied in a constructively simple way and produced inexpensively while however being reliable in use and having a long service life.

SUMMARY OF THE INVENTION

This object is solved for the module of the aforementioned kind in accordance with the invention in that the second tubular section adjoins a valve that comprises three connectors, in that the first connector is connected in flow communication to the second tubular section, and in that the second connector of the valve is selectively connectable via a first line with the first connector and via a second line to the third connector. The object is further solved for the conveyor system of the aforementioned kind in accordance with the invention in that the matrix station is comprised of at least two modules of the invention as defined above.

In the module according to the invention, the second tubular section is connected to a valve that is provided with three connectors. The first connector of the valve is permanently connected to the second tubular section. The second connector of the valve can be selectively connected by a first line to the first connector and by a second line to the third connector. By means of the first line, the second connector is joined by a line connection to the consumer. Then, the bulk goods can be supplied through the valve via the first line and the second connector to the consumer. When the second and the third connectors are connected to each other via the second line in flow communication, then the first connector, via which the bulk goods is supplied from the sender, is separated from the consumer. In this case, the first connector of the valve is air-tightly closed off. By means of the second line, a through passage through the valve is formed that connects the second with the third connector.

The module according to the invention is characterized by its simple constructive configuration. It can be manufactured inexpensively and is problem-free in use.

Advantageously, the first and the second connectors of the valve are arranged angularly relative to each other. Since the second tubular section is connected to the first connector and the consumer to the second connector, a very compact configuration of the matrix station can be achieved due to the angular arrangement of these two connectors. The first tubular section of the module as well as the valve can be arranged in this way in two different planes so that with the modules a matrix station can be constructed in which a plurality of modules are arranged adjacent and atop each other within a very tight space.

It is advantageous when the second and the third connectors of the valve are positioned opposite each other. Then the third connector is also positioned angularly in relation to the first connector to which the second tubular section is connected. Such a configuration of the valve contributes to a compact configuration of the module and thus also of the matrix station which is assembled of individual modules.

Preferably, the lines are tubular pieces. They are inexpensively and simply producible components, which advantageously contributes to the inexpensive manufacture of the module.

In an advantageous configuration, the connectors of the valve are formed by tubular sections. They also contribute to an inexpensive manufacture of the module.

The lines can be part of a valve slider which is slidably supported in a housing. It can be moved between two positions in accordance with the two lines. In the first position, the first line connects the first connector to the second connector which is joined by a line connection to the consumer. The valve slider can be moved into a second position in which the second line connects the second and third connectors. The valve slider enables thus a simple switching between the connectors in that it is simply moved from one into the other position. The valve slider is accommodated in the housing so as to be at least partially protected.

In a constructively simple and inexpensive configuration, the valve slider is designed to have a frame shape and is provided with a bottom. Such a valve slider can be manufactured very simply and inexpensively. In this context, the frame sides as well as the bottom can serve as closure elements in order to close off the respective connector that is not needed in the corresponding switching position of the valve slider. Then no separate closure elements are required.

It is advantageous in this context when the valve slider comprises a rectangular frame. With the latter, it is reliably possible to guide the valve slider during its displacement movement between the two switching positions.

In an advantageous embodiment, the valve slider is provided completely in the housing so that it does not project from the housing in both switching positions.

In another advantageous embodiment, the housing is configured such that the valve slider projects from the housing with that part in which the line is located that is not needed for the switching position.

In a constructively simple configuration, the second and the third connectors of the valve are arranged at oppositely positioned sidewalls of the housing.

The first connector to which the second tubular section is connected is advantageously located at a bottom of the housing.

The three connectors of the valve can be attached to the housing in a simple way, which contributes to an inexpensive manufacture.

Preferably, the connectors are formed by tubular sections that project into the housing. These tubular sections have only a minimal length wherein the part of these tubular sections that is projecting into the housing can be designed to be very short. The housing and thus the valve can thus be configured to be very compact.

It is advantageous in this context when seals are seated on the ends of the tubular sections projecting into the housing. They ensure that in the respective switching position of the valve slider a pressure-tight connection between the respective connector and the lines of the valve slider is ensured. The seals themselves can be very simply and reliably fastened on the projecting tubular section ends.

The lines in the valve slider are advantageously provided such that they end flush with the frame sides and the frame bottom of the valve slider. The valve slider itself is configured in this context such that, with the corresponding outer sides of the frame sides and of the frame bottom, it is seal-tightly contacting the respective connectors so that, depending on the switching position of the valve slider, a proper pressure-tight connection between the connectors and the respective lines of the valve slider is achievable.

It is in principle also possible to configure the connectors of the valve that are embodied as tubular sections such that they do not project into the interior of the housing but end flush with the inner side of the housing walls.

In this case, the lines project past the valve slider into the interior of the housing to such an extent that these lines, depending on the position of the valve slider, adjoin seal-tightly the connectors of the housing.

It is advantageous in this context when seals are seated on the ends of the lines which are projecting past the valve slider. They contribute to the pressure-tight connection in the respective switching position of the valve slider. Moreover, the seals can be simply and reliably fastened to the projecting line ends.

The lines of the module according to the invention can also be part of a respective valve insert which is inserted into a valve carrier. Such an embodiment of the module is a very inexpensive solution and is in particular beneficial when a material change of the bulk goods is carried out only at larger time intervals. Frequently, a material change is required only once a week or even only once a month. The use of the valve inserts for the operator of a system is then an extremely inexpensive solution. He must only insert one or the other valve insert into the valve carrier.

The valve carrier has advantageously two oppositely positioned sidewalls and a bottom. The valve carrier in this case is approximately U-shaped and enables a simple insertion of the respective valve insert.

The first connector is located in this case in the bottom and the second and third connectors in the sidewalls of the valve carrier. The three connectors can thus be provided within a small space at the module.

Advantageously, the valve inserts also each comprise a bottom and two oppositely positioned sidewalls. These valve inserts are designed in this context such that they can be inserted into the valve carrier.

In one of the valve inserts, the first line with its ends is fastened in through openings in one sidewall and in the bottom of the valve insert. When this valve insert is inserted into the valve carrier, via these through openings the line connection between the first and the second connectors of the valve is produced. In this context, the valve insert and the valve carrier are, of course, designed such that an air-tight connection between the first line and the first and the second connectors is produced.

In the other valve insert, the second line is fastened with its ends in through openings in the two sidewalls of the valve insert. When this valve insert is inserted into the valve carrier, the second and the third connectors of the valve are joined to each other by a line connection. In this case, it is also ensured that an air-tight connection between the second line and the second and third connectors is ensured. The through opening in the bottom of the valve carrier is air-tightly closed in this context, advantageously by the bottom of the other valve insert.

In order for the valve inserts to be reliably held in the valve carrier, the valve inserts are advantageously provided with at least one fastening part, respectively. With it, the respective valve insert can be held at the valve carrier after insertion.

A simple fastening of the valve insert at the valve carrier results when the fastening part is configured as a plug-in part which is plugged into a plug-in opening of the valve carrier. Such a configuration enables a simple exchange of the valve insert.

The conveyor system according to the invention is characterized in that the matrix station is formed of at least two modules according to the invention.

Advantageously, the matrix station is comprised of a plurality of modules according to the invention which are plug-connected to each other in a simple way. In this way, the matrix station can be produced in a simple and thus inexpensive way and in particular can also be expanded at any time.

Inside the matrix station, the valves of the individual modules are advantageously joined by a line connection via the second and third connectors. In addition, each valve is joined by a line connection via the first connector to the second tubular section of the modules.

In a preferred embodiment, a check valve which closes toward the matrix station is provided in the line connection between the matrix station and the consumer. In this way, there is the possibility that, for example, all valves at the matrix station can be opened, for example, when several consumers are supplied with bulk goods from one sender. The check valves ensure that sequentially the individual consumers are supplied with the bulk goods from the sender. Switching of the valves is thus not necessary.

The check valves are embodied so as to close toward the matrix station when the conveyor system is a suction conveyor system in which the bulk goods are conveyed by means of vacuum from the sender to the consumer.

However, the conveyor system can also operate with pressure so that in this case the check valves are not embodied to close toward the matrix station but toward the consumer.

The subject matter of the application results not only from the subject matter of the individual claims but also from all specifications and features disclosed in the drawings and in the description. They are, even if they are not subject matter of the claims, considered as important to the invention in so far as, individually or in combination, they are novel relative to the prior art.

Further features of the invention result from the further claims, the description, and the drawings.

BRIEF DESCRIPTION OF THE DRAWINGS

The invention will be explained in more detail with the aid of some embodiments illustrated in the drawings. It is shown in:

FIG. 6 a plan view of the valve according to FIG. 5;

FIG. 7 a section along the line A-A in FIG. 6;

FIG. 8 a plan view of the valve according to FIG. 4;

FIG. 9 a section along the line B-B in FIG. 8;

FIG. 10 in perspective illustration a second embodiment of a module according to the invention with a valve whose valve slider is in a first position;

FIG. 11 in an illustration corresponding to FIG. 10 the module according to the invention with the valve slider in a second position;

FIG. 12 and

FIG. 13 the valve according to FIG. 11;

FIG. 14 a plan view of the valve according to FIG. 12;

FIG. 15 a bottom view of the valve according to FIG. 12;

FIG. 16 a view in the direction of arrow XVI in FIG. 14;

FIG. 17 a plan view of the valve according to FIG. 13;

FIG. 18 a bottom view of the valve according to FIG. 13;

FIG. 19 a view in the direction of arrow XIX of FIG. 17;

FIG. 22 in perspective illustration a further embodiment of a module according to the invention without valve insert;

FIG. 23 in perspective illustration the module according to FIG. 22 with an inserted first valve insert;

FIG. 25 a side view of the embodiment according to FIG. 22;

FIG. 26 a section along the line A-A in FIG. 25;

FIG. 27 in side view the module according to FIG. 22 with inserted first valve seat;

FIG. 28 a section along the line A-A in FIG. 27;

FIG. 33 in side view the valve carrier 31 with inserted first valve insert;

FIG. 34 in perspective illustration the valve carrier according to FIG. 33 with inserted first valve insert;

FIG. 35 in side view the valve carrier of the module according to FIG. 22 with inserted second valve insert;

FIG. 36 in perspective illustration the valve carrier according to FIG. 35;

FIG. 37 in end view the valve carrier of the module according to FIG. 22;

FIG. 38 a section along the line B-B in FIG. 37;

FIG. 39 in side view the valve carrier with inserted first valve insert;

FIG. 40 a section along the line B-B in FIG. 39;

FIG. 41 the valve carrier in side view with inserted second valve insert;

FIG. 42 a section along the line B-B in FIG. 41;

FIGS. 43 to 45 different views of a further embodiment of a valve of the module according to the invention;

FIG. 46 a plan view of the valve according to FIGS. 43 to 45;

FIG. 47 the valve according to FIGS. 43 to 45 in perspective illustration;

DESCRIPTION OF PREFERRED EMBODIMENTS

Figure 1:
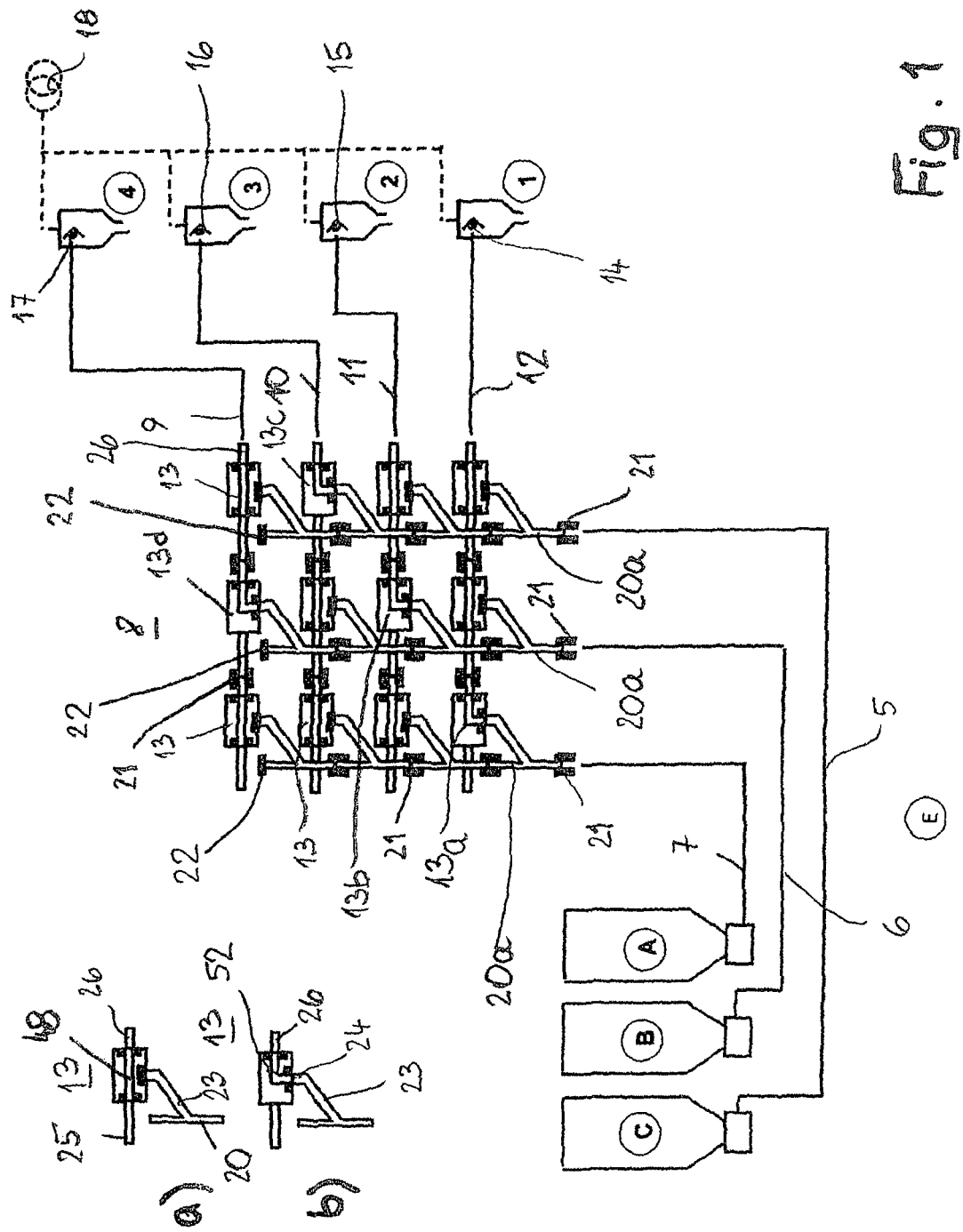
FIG. 1 in schematic illustration a conveyor system according to the invention with which bulk goods are supplied from senders through a matrix station to consumers.

FIG. 1 shows in schematic illustration a pneumatic suction conveyor system with which bulk goods are conveyed from at least one sender A to C to at least one consumer 1 to 4. In the illustrated example, three senders A to C as well as four consumers 1 to 4 are provided. The senders A to C are, for example, storage containers in which the bulk goods to be transported are stored. The consumers 1 to 4 can be, for example, mixing and drying devices, processing machines, and the like.

Each sender A to C is connected by sender lines 5 to 7 to a matrix station 8. Through it, the bulk goods can be supplied from the senders A to C to the consumers 1 to 4 via consumer lines 9 to 12. By means of the matrix station 8, it is possible to connect each one of the senders A to C to each one of the consumers 1 to 4.

The matrix station 8 has valves 13 arranged above and adjacent to each other which can be switched such that the desired sender A to C can be connected in flow communication to the desired consumer 1 to 4. In FIG. 1, it is illustrated in an exemplary fashion that some of the valves 13 of the matrix station 8 are switched such that the sender A via the lines 7, 12 is connected in flow communication to the consumer 1, the sender B via the lines 6, 11 to the consumer 2, and the sender C via the lines 5, 10 to the consumer 3. Moreover, the sender B is joined via the lines 6, 9 also to the consumer 4 by a line connection. This is possible because the consumers 1 to 4 each are provided with a check valve 14 to 17. These check valves 14 to 17 are arranged in the consumer lines 9 to 12 and embodied such that they permit the respectively supplied bulk goods to enter the consumer 1, 4, but close off the respective consumer line 9 to 12 in case of non-conveyance. Due to the check valves 14 to 17, it is possible that the consumer 2 as well as the consumer 4 in the example may receive the material from the sender 8, however not simultaneously but one after the other temporally.

The valves 13 are of the same configuration and will be explained below in more detail. In FIGS. 1a and 1b, the two positions of the valve 13 are illustrated. In the position according to FIG. 1a, the connection between the sender lines 5 to 7 and the consumer lines 9 to 12 is interrupted so that in this position no bulk goods from the senders can reach the consumers.

In the position according to FIG. 1b, the valve 13 is switched such that the bulk goods from the senders A to C can reach the consumers 1 to 4.

The consumers 1 to 4 are connected to a common vacuum source 18 in the illustrated embodiment of FIG. 1. It is advantageously provided by a suction blower. In principle, there is the possibility of providing each consumer 1 to 4 with its own vacuum source 18.

Figure 3:
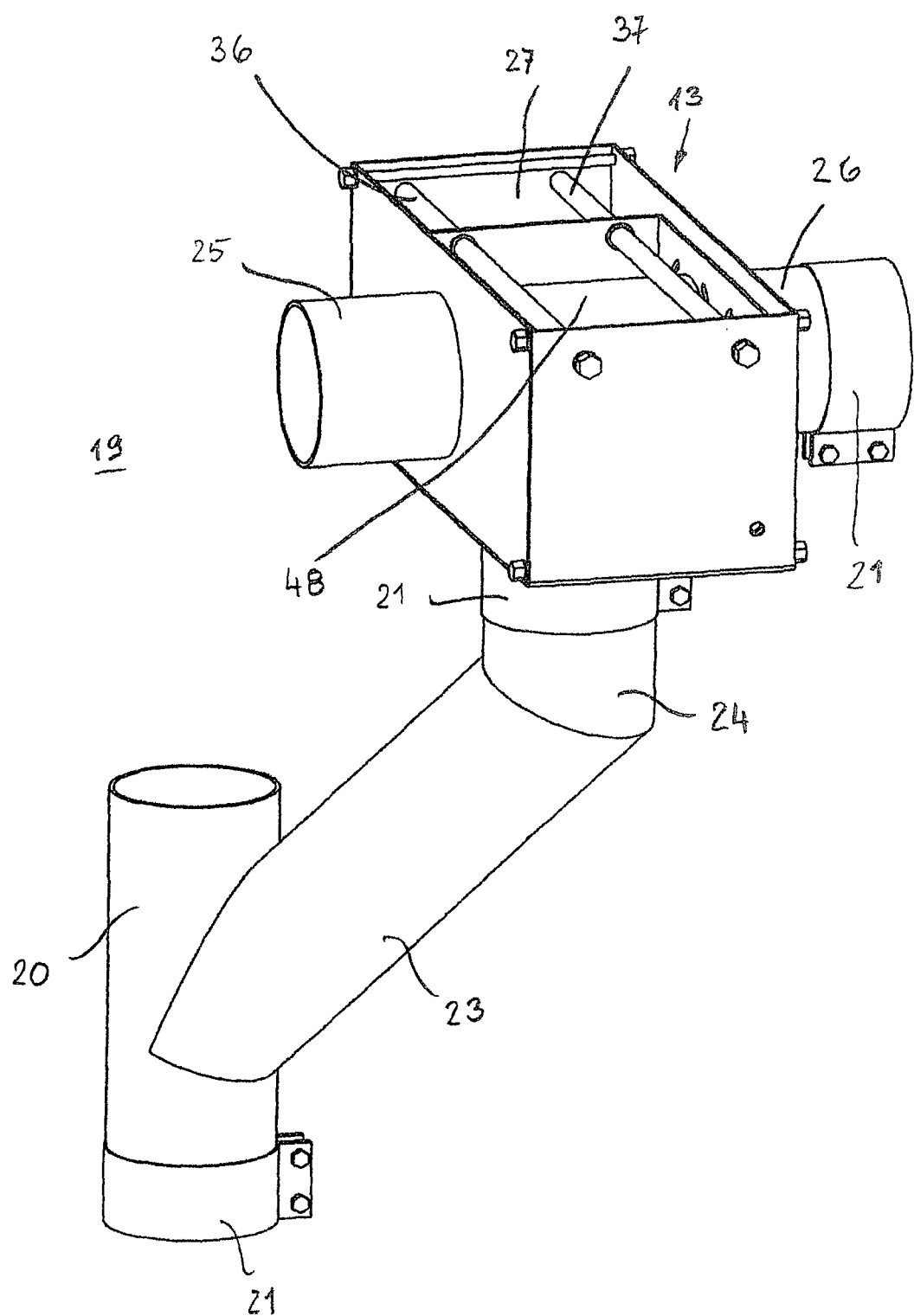
FIG. 3 in enlarged and perspective illustration a module according to the invention of the matrix station according to FIG. 2.

The matrix station 8 is assembled of individual modules. FIG. 3 shows one of these modules 19. Based on FIG. 3, the module 19 will be explained in more detail.

Figure 2:
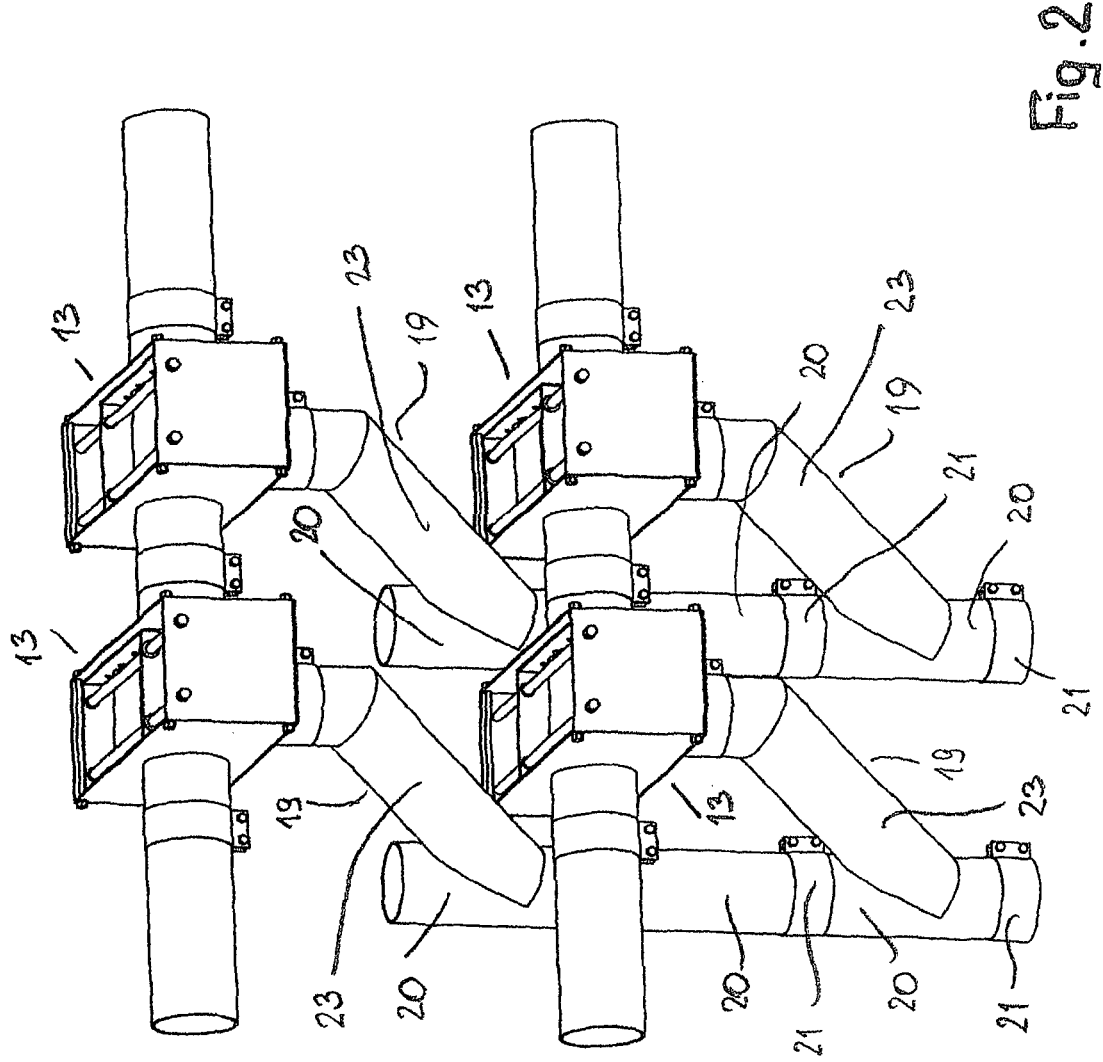
FIG. 2 in enlarged and perspective illustration a part of the matrix station according to FIG. 1.

The module 19 has a straight tubular section 20 which is provided at its bottom end in FIG. 3 with a coupling piece 21 that, for example, is a pipe clamp. By means of the coupling piece 21, the tubular section 20 can be detachably connected to a further tubular section 20 (FIG. 2). Since the coupling pieces 21 are advantageously configured as pipe clamps, a simple pressure-tight connection between the tubular sections 20 adjoining each other is ensured. The tubular sections 20 can be connected to each other by a simple plug-in process in order to produce a continuous line of the tubular sections 20 (FIG. 2). As shown in FIG. 1, a vertical line 20a is formed of the plugged-in tubular sections 20 and is closed off at the upper end by a blocking part 22 (FIG. 1). The respective sender line 5 to 7 is connected by means of the coupling piece 21 to the other end of the lines 20a.

A tubular section 23 branches off the straight tubular section 20 at an acute angle and extends also straight and, at the free end, is provided with a connector piece 24 that is positioned at an obtuse angle thereto and extends parallel to the tubular section 20. At the free end of the connector piece 24, there is also a coupling piece 21 which is advantageously embodied as a pipe clamp. The valve 13 which is a component of the module 19 is connected by means of the coupling piece 21 of the connector piece 24.

The tubular sections 23 that are branching off ensure that the valves 13 are laterally positioned in the region adjacent to the vertical tubular sections 20 (FIG. 2).

The valve 13 has a respective tubular connector 25, 26 at oppositely positioned sides. Each tubular connector 25, 26 is formed by a short tubular piece. At the free end of the tubular connector 26, a coupling piece 21 is provided that advantageously is formed by a pipe clamp and has the same configuration as the described pipe clamps at the tubular sections 20 and 23, 24. The two tubular connectors 25, 26 are aligned with each other.

As can be seen in FIG. 1a, the two tubular connectors 25, 26 of the valve 13 can be connected to each other in flow communication. In this case, the valve 13 has no line connection to the tubular sections 20, 23. By means of the tubular connectors 25, 26, the adjacently positioned valves 13 are connected to each other (FIG. 1) wherein the tubular connector 26 of the valve 13 which is positioned adjacent to the respective consumer 1 to 4 is connected to the respective consumer via the consumer line 9 to 12.

The line connection between the tubular connectors 25, 26 is realized by means of a valve slider 27 which is adjustably arranged in the valve 13.

The valve slider 27 (FIG. 3) can be moved into a position (FIG. 1b) in which the tubular connector 26 is joined to the connector piece 24 of the tubular section 23 by a line connection.

The valve 13 has a parallelepipedal housing 28 in which the valve slider 27 is slidable. The housing 28 has two sidewalls 29, 30 positioned parallel to each other and connected to each other by transverse walls 31, 32 which are also positioned parallel to each other. The sidewalls 29, 30 form the longitudinal sides of the housing 28 while the transverse walls 31, 32 form the narrow sides. The walls 29 to 32 are advantageously detachably connected to each other. At the top and bottom sides, the walls 29 to 32 are connected to each other by a bottom 33 and a cover 34. The oppositely positioned transverse walls 31, 32 are connected to each other by a guide 35 for the valve slider 27. Advantageously, the guide 35 is formed by two guide rods 36, 37 that are parallel to each other. They are located near the rim region of the transverse walls 31, 32 facing away from the bottom 33 and have a minimal spacing from the sidewalls 29, 30. It is possible that such a guide is also present near the bottom 33 so that the valve slider 27 can be reliably displaced in the housing 28.

The valve slider 27 has a rectangular frame 38 with longitudinal sides 39, 40 that are parallel to each other and narrow sides 41, 42 connecting them (FIG. 6). The frame sides 39 to 42 extend almost across the entire height of the housing walls 29 to 32.

The frame sides 39 to 42 are connected by a bottom 43 to each other which is provided adjacent to the bottom 33 of the housing 28 (FIG. 7).

Figure 4:
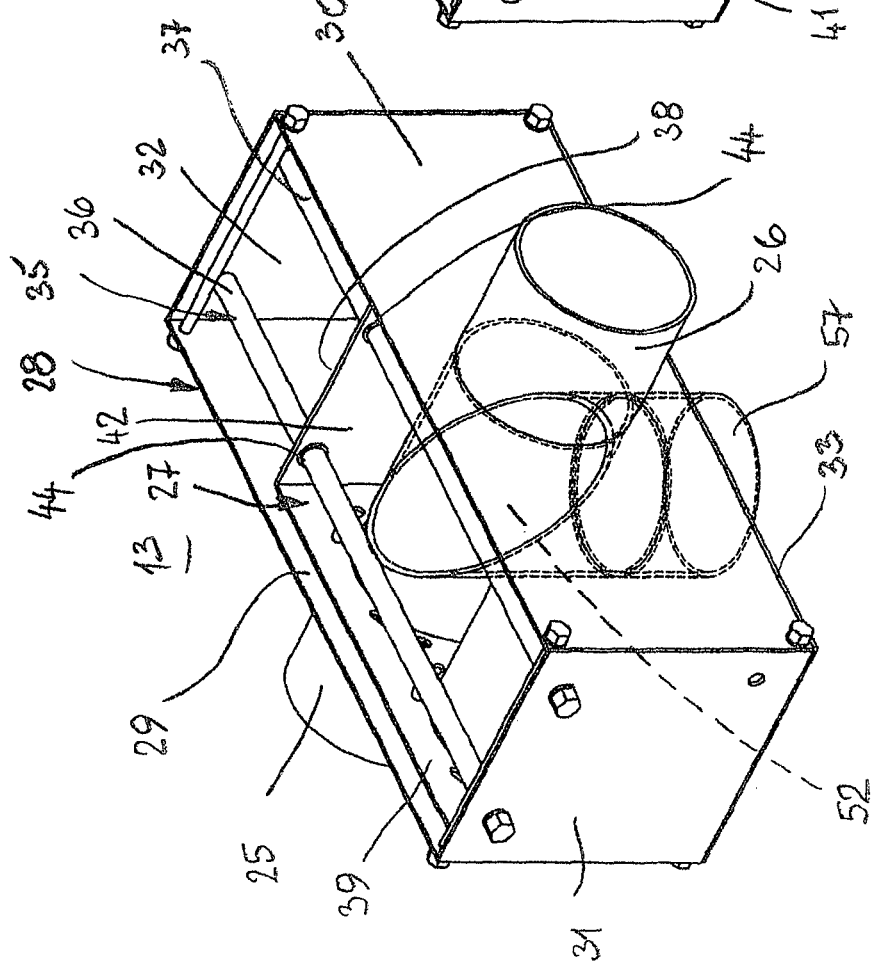
FIG. 4 in perspective illustration a valve of the module according to the invention according to FIG. 3 in a first position.

The oppositely positioned narrow sides 41, 42 of the frame 38 each have through openings 44 for the guide rods 36, 37 (FIGS. 4 and 6). In the openings 44, glide rings 45 can be positioned with which easier gliding of the valve slider 27 on the guide rods 36, 37 is possible.

There is a through opening 46, 47, respectively, in the oppositely positioned longitudinal sides 39, 40 of the frame 38. The two through openings 46, 47 are connected to each other by a tubular piece 48. It is located adjacent to the narrow side 41 of the frame 38.

When the valve slider 27 is in the position illustrated in FIGS. 6 and 7, the tubular piece 48 connects the two tubular connectors 25, 26 to each other. As can be seen in FIG. 1a, a line passing through the valve 13 is formed in this position of the valve slider 27. The tubular piece 48 adjoins in this position air-tightly the two tubular connectors 25, 26. It is advantageous in this context when the end of the tubular piece 48 penetrating through the through openings 46, 47 is surrounded by a sealing ring 49, 50 (FIG. 6), respectively.

In this position of the valve slider 27, its bottom 43 closes off the tubular connector 57 which is provided in the bottom 33 of the housing 28 (FIG. 7). In this case, the tubular connector 57 in the housing bottom 33 is also air-tightly closed off.

As can be seen in FIG. 7, the through openings 46, 47 are surrounded at minimum spacing by openings 51 which, for example, are embodied to have an elongate curved shape. They form venting openings which enable easy sliding of the valve slider 27 despite the sealing rings 49, 50 which are contacting the inner sides of the housing walls 29, 30.

The valve slider 27 is provided with a further tubular piece 52 which is embodied as an elbow. One elbow section 53 adjoins a through opening 54 in the longitudinal side 40 of the frame 38 in an air-tight manner.

In the position of the valve slider 27 according to FIGS. 6 and 7, the tubular piece 52 is positioned at a spacing adjacent to the tubular connectors 25, 26 (FIG. 6). In this way, the two tubular connectors 25, 26 in the described way are joined to each other by a line connection through the straight tubular piece 48. The valve slider 27 in this position has been moved within the housing 28 such that the narrow side 42 of the frame 38 is located at a minimal spacing adjacent to the transverse wall 32 of the housing 28.

In FIGS. 4, 5, 8, and 9, the valve slider 27 has been displaced along the guide 35 such that the elbow section 53 adjoins air-tightly the tubular connector 26 and the elbow section 55 adjoins air-tightly the tubular connector 57 in the bottom 33 of the housing 28. The tubular connector 25 is seal-tightly closed off by the longitudinal side 39 of the frame 38. In this position of the valve slider 27, the tubular section 23 of the module 19 is connected through the tubular piece 52 to the tubular connector 26 and is thus joined by a line connection to the respective consumer 1 to 4 (FIG. 1b).

In this position, the valve slider 27 is moved such that the narrow side 41 of the frame 38 is positioned adjacent to the transverse wall 31 of the housing 28.

Advantageously, the valve 13 is designed such that the valve slider 27 in both described positions is moved against a stop so that the respective line connection by means of the straight tubular piece 48 or the bent tubular piece 52 can be reliably adjusted.

The two elbow sections 53, 55, as can be seen in FIGS. 8 and 9, are also surrounded about a portion of their circumference by through openings 58, 59 which are provided in the longitudinal side 40 as well as in the bottom 43 of the frame 38. The through openings 58, 59 ensure that the valve slider 27 can be exactly displaced between its two positions in the housing 38.

The valve 13 is designed such that the respective tubular piece 48, 52 that is not in use, respectively, is located completely outside of the region of the tubular connectors 25, 26, 57. The tubular connectors 25, 26, 57 are positioned in a common plane, advantageously centrally in relation to the housing 28.

Figure 5:
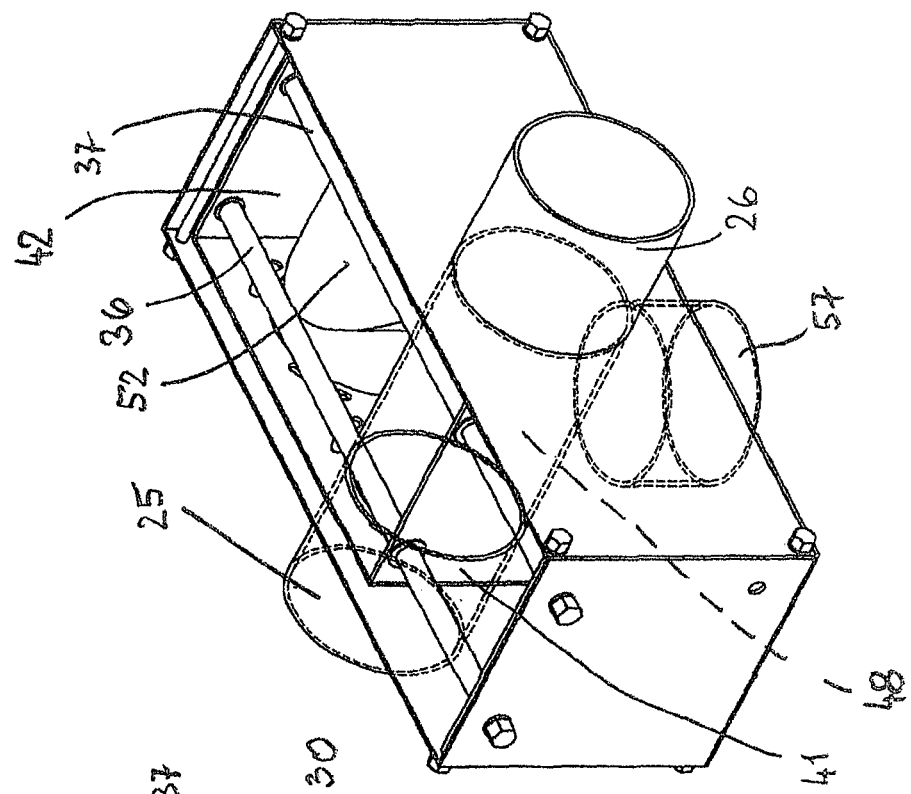
FIG. 5 in an illustration corresponding to FIG. 5 the valve in a second position.

In the suction conveyor system according to FIG. 1, the valve sliders of the valves 13a to 13d have been moved into the position according to FIGS. 8 and 9 so that the respective tubular connectors 57 are joined by a line connection to the tubular connectors 26 of these valves by means of the tubular pieces 52. The valve sliders 27 of the remaining valves are in the position as illustrated in FIGS. 5 to 7. The valves 13a to 13d form thus parts of the consumer lines 9 to 12 via which the bulk goods are conveyed from the respective sender lines 5 to 7 to the respective consumers 1 to 4.

The adjustment of the valve slider 27 can be realized in an advantageous way by a drive (not illustrated) so that the valve slider 27 can be displaced by a motor, by a pneumatic system or hydraulic system and the like into the two described positions.

FIGS. 10 to 19 show a valve 13 that, in principle, is of the same configuration as the afore described embodiment. Therefore, in the following only the different features will be described.

In the described embodiment, the frame 38 is completely accommodated within the housing 28 of the valve 13. In the embodiment described in the following, the frame 38 projects, depending on the position, past one or the other housing wall. The housing 28 is therefore embodied significantly more narrow than in the preceding embodiment.

FIG. 10 shows the frame 38 in a position in which the tubular connector 26 is joined by a line connection to the bottom-side tubular connector 57. The straight tubular piece 48 of the frame 38 is located outside of the housing 28.

The housing 28 has the two sidewalls 29, 30 that are positioned parallel to each other and where the tubular connectors 25, 26 are provided. The sidewalls 29, 30 connect the bottom 33 to the cover 34 of the housing 28. In this embodiment, the sidewalls 29, 30, the bottom 33, and the cover 34 are advantageously also detachably connected to each other.

The sidewalls 29, 30 as well as the bottom 33, viewed in plan view, are extended past the cover 34 so that the frame 38 is reliably guided despite the narrow configuration of the housing 28.

In the described embodiment, the frame 38 and thus the valve slider 27 are advantageously manually displaced between the positions illustrated in FIGS. 10 and 11. For this purpose, at the narrow side 41 of the frame 38, a transversely projecting grip 60 can be provided with which the frame 38 can be displaced reliably between the two positions. For example, the grip 60 is screwed into a threaded opening 61 (FIG. 12) in the narrow side 41 of the frame 38. Of course, also any other suitable grip configuration can be employed.

In the position of the valve slider 27 according to FIGS. 10, 12 and 14 to 16, the tubular connector 26 is connected by the bent tubular piece 52 with the bottom-side tubular connector 57 so that the bulk goods can be conveyed from the respective sender A to C to the respective consumer 1 to 4. The valve slider 27 in this position is limited by a stop so that the user can adjust very simply this position by means of the grip 60.

When the valve slider 27 is displaced into its other position (FIGS. 11, 13 and 17 to 19), then, as has been explained with the aid of the preceding embodiment, the two tubular connectors 25, 26 are joined by a line connection to each other by means of the straight tubular piece 48. In this case, there is no connection through the valve 13 between the respective sender A to C and the respective consumer 1 to 4. The bottom 43 of the valve slider 27 closes off the tubular connector 57 in this position.

In this second position, the valve slider 27 is also limited by a stop. The bent tubular piece 52 is located in the region outside of the housing 28 (FIGS. 11, 13 and 17).

Figure 20:
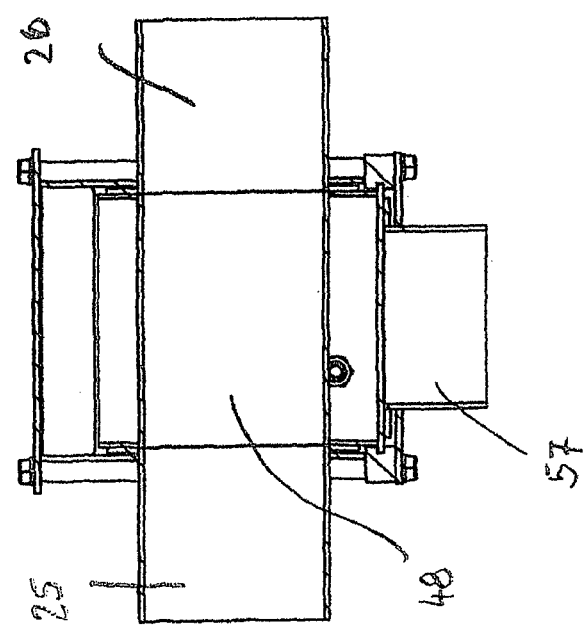
FIG. 20 a section along the line A-A in FIG. 19.

FIG. 20 shows how the two tubular connectors 25, 26 are joined by a line connection to each other by the straight tubular piece 48. The tubular connectors 25, 26 as well as the straight tubular piece 48 have the same inner diameter so that a line with constant inner cross section passing through the valves 13 is formed. The tubular connector 57 to which the slanted upwardly extending tubular sections 23 are connected is without connection to the tubular connectors 25, 26 and the tubular piece 48.

Figure 21:
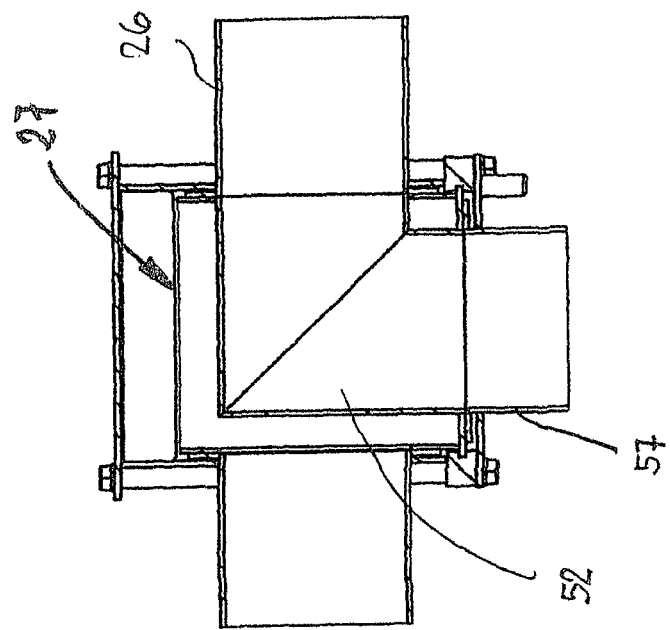
FIG. 21 a section along the line A-A in FIG. 16.

FIG. 21 shows the position of the valve slider 27 according to FIG. 12. In this case, the tubular connector 26 is joined by a line connection via the bent tubular piece 52 to the bottom-side tubular connector 57. The tubular piece 52 has the same inner diameter as the tubular connectors 26, 57. In FIG. 21, the tubular piece 52 is not embodied as a bent, but as an angled, tubular piece. Such a tubular piece can be combined in a simple way of two straight tubular sections. The bulk goods conveyed via the tubular connector 57 pass through the tubular piece 52 into the tubular connector 26 and from there to the respectively connected consumer 1 to 4.

All valves 13 of the matrix station 8 are embodied in the described way. They are constructively simple components that can be inexpensively manufactured and are reliable in use. The valves 13 ensure a long service life of the matrix station 8 and thus of the entire suction conveyor system.

The matrix station 8 can be expanded with the modules 19 in a very simple way because the modules in the described way can be connected by simple plug-in connections with each other.

Instead of being operated with vacuum, the suction conveyor system can also be operated with pressure. The basic operation of the pneumatic conveyor system does not change thereby.

By means of the valve slider 27, it is possible in the described way to connect the tubular connector 26 selectively to the tubular connector 25 or the tubular connector 57. When the valve slider 27 is in the switching position illustrated in FIG. 11, the tubular connector 57 which forms the inlet of the valve 13 is open. When the valve slider 27 is moved into the position according to FIG. 12, the passage for the bulk goods is released by the valve 13 so that it can be conveyed from the sender A to C to the selected consumer 1 to 4.

Depending on the position of the valve slider 27, the respective consumer line 9 to 12 can be emptied by suction which is required, for example, when changing the bulk goods. There is in particular also the possibility to empty by suction the sender lines 5 to 7 when the valve slider 27 is in the position according to FIG. 12.

The check valves 14 to 17 make it possible that, for example, two but also all consumers 1 to 4 obtain the bulk goods from one sender. Supplying the consumers 1 to 4 is in this case done temporally one after the other without the respective valves 13 having to be switched. Sliding of the valve slider 27 is only required when the respective consumer 1 to 4 is to be connected with another sender A to C.

In deviation from the illustrated embodiments, the tubular connectors 25, 26, 57 can also be provided at the housing 28 such that they slightly project inwardly into the housing 28. In this case, the seals 49, 50 are positioned on the projecting ends of the tubular connectors 25, 26, 57. For this purpose, the tubular pieces 48, 52 are arranged in the valve slider 27 such that they are flush with the outer side of the longitudinal sides 39, 40 and of the bottom 43 of the frame 38. In this case, in both positions of the valve slider 27 it is also ensured that the tubular pieces 48, 52 adjoin air-tightly the corresponding tubular connectors 25, 26, 57.

The modules 19 are assembled to the matrix station 8 such that the tubular sections 20 form vertical lines which are positioned in a common plane. The consumer lines 9 to 12 as well as the adjoining lines which are passing through the valves 13 and which include the straight tubular pieces 48 then extend advantageously horizontally (FIG. 1). The thus formed horizontal lines are positioned at a distance above each other also in a common plane which is displaced relative to the plane in which the vertical lines are located. Such an arrangement of the vertical and horizontal lines in two different planes enables a very compact matrix station 8 which requires only little space, even when it comprises a plurality of modules 19.

The embodiment according to FIGS. 22 to 42 is suitable for applications in which a material change is not frequently performed. In this case, no valve slider is provided but two valve inserts are used which are inserted by hand into a valve carrier. The module 19 of this embodiment differs from the preceding embodiment by this different configuration of the valve 13.

The module 19 has the straight tubular section 20 from which the tubular section 23 branches off at an acute angle. In contrast to the preceding embodiments, the tubular section 23 extends directly to the valve 13.

The valve 13 has a valve carrier 62 which is substantially embodied in a U-shape. The valve carrier 62 has a plate-shaped base part 63 which has a rectangular contour. At its two narrow sides, a plate-shaped leg 64, 65 adjoins, respectively, which also has a rectangular contour. The two legs 64, 65 extend perpendicularly to the base part 63 and are advantageously formed as one piece together therewith. The valve carrier 62 can therefore be bent advantageously from a strip of sheet metal.

The legs 64, 65 which are projecting vertically away from the base part 63 have advantageously the same contour shape.

The base part 63 comprises the tubular connector 57 to which the tubular section 23 is joined. It comprises the coupling piece 21 (FIGS. 25 and 26) with which in the described way a pressure-tight connection between the tubular section 23 and the tubular connector 57 can be produced. As illustrated in FIG. 25, the base part 63 of the valve carrier 62 is positioned perpendicularly to the axis of the tubular section 23.

The tubular connector 57 projects through an opening 66 in the base part 63 (FIG. 38). The tubular connector 57 is at one end surrounded by a flat sealing ring 67 which is resting against the base part 63.

The leg 64 of the valve carrier 62 has the through opening 46 through which the tubular connector 25 is projecting. Its end which is projecting past the leg 64 is surrounded by a flat sealing ring 68 which is resting against the inner side of the leg 64 which is facing the leg 65.

The other leg 65 of the valve carrier 62 is provided with through opening 47 through which the tubular connector 26 is projecting. It is surrounded at its projecting end by a flat sealing ring 69 which is resting against the inner side of the leg 65 which is facing the leg 64. The tubular connector 26 is, for example, longer than the tubular connector 25.

In accordance with the preceding embodiments, the two tubular connectors 25, 26 are positioned in alignment relative to each other and have advantageously the same inner diameter. The tubular connectors 25, 26, 57 project only slightly past the base part 63 as well as the legs 64, 65 of the valve carrier 62 and are fastened in a suitable way in the through openings 46, 47, 66.

The two legs 64, 65 comprise the part-circular through openings 58, 59 which are arranged distributed about the circumference of the through openings 46, 47. They have minimal radial spacing from the through openings 46, 47 and ensure that the sealing rings 67 to 69 rest seal-tightly against the base part 63 or the legs 64, 65 of the valve carrier 62. The sealing rings 67 to 69 are so wide that they cover the through openings.

The two legs 64, 65 of the valve carrier 62 each have a slot 70, 71 (FIG. 22) located at the same level and extending from the free rim 72, 73 of the legs 64, 65 across a portion of the height of the leg. The slots 70, 71 are positioned adjacent to a narrow side of the legs 64, 65 and in the region outside of the through openings 46, 47 for the tubular connectors 25, 26.

Two valve inserts 74 and 75, with which the tubular connector 26 can be joined by a line connection to the tubular connector 57 or to the tubular connector 25, are inserted selectively into the valve carrier 62.

Figure 24:
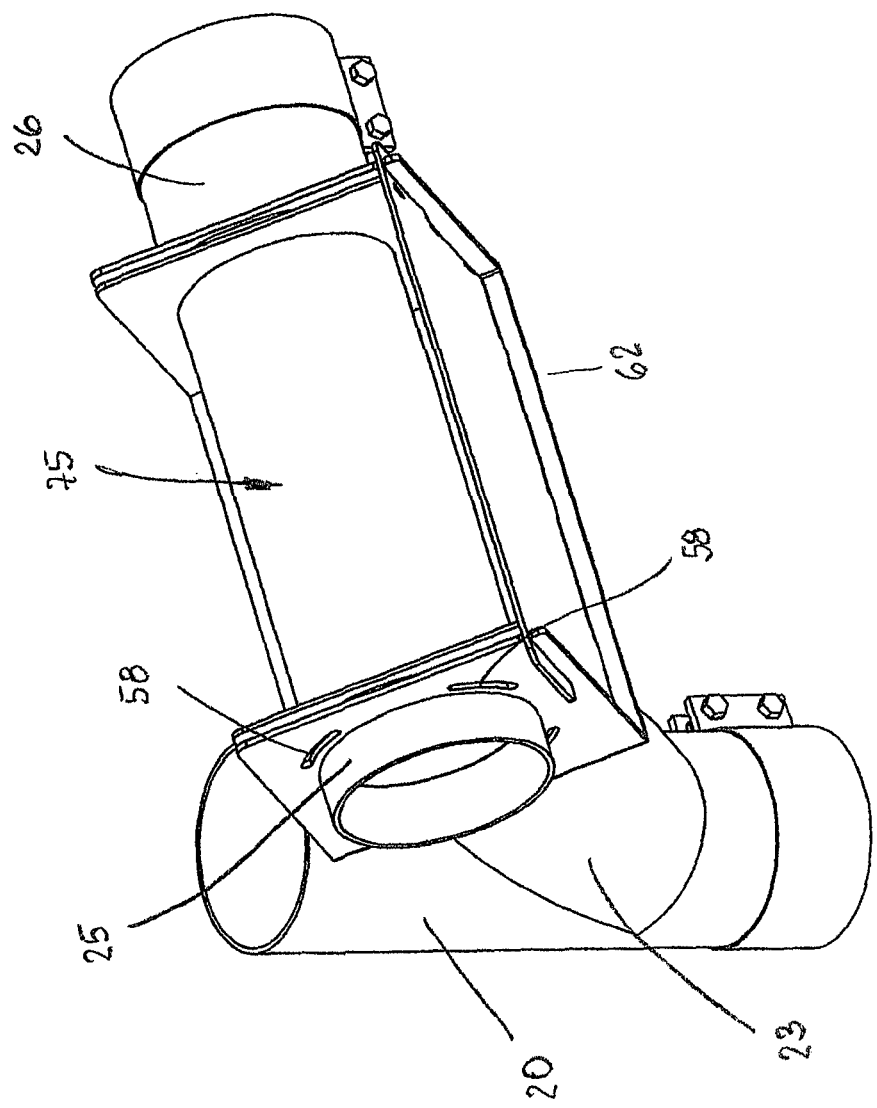
FIG. 24 in an illustration corresponding to FIG. 23 the module with inserted second valve insert.

According to FIG. 23, the valve insert 74 is inserted in the valve carrier 62 and connects the tubular connector 26 to the tubular connector 57. FIG. 24 shows the situation in which the valve insert 75 is inserted into the valve carrier 62 and connects the tubular connector 26 to the tubular connector 25.

By means of the two valve inserts 74, 75 it is possible in the same way as with the valve slider 27 of the afore described embodiments to connect the consumer 1 to 4, connected to the tubular connector 26, to the sender lines 5 to 7 or to separate them therefrom.

The valve insert 74 has two sidewalls 76, 77 that are positioned parallel to each other and are connected by a bottom 78 to each other (FIGS. 23 and 28). Also, the sidewalls 76, 77 are connected at a rim by a longitudinal wall 79 to each other. The longitudinal wall 79 has at its upper rim tongues 80, 81 projecting past its narrow sides which engage the slots 70, 71 of the legs 64, 65. The tongues 80, 81 and the slots 70, 71 are designed such that the bottom 78 in the mounted position has a spacing from the bottom 63 of the valve carrier 62 (FIG. 28).

The sidewall 77 of the valve insert 74 is provided with a through opening 82 (FIG. 28) that has the same diameter as the through opening 47 of the leg 65. The tubular piece 52 whose end face is flush with the outer side of the sidewall 77 facing the leg 65 of the valve carrier 62 projects into the through opening 82. As in the preceding embodiments, the tubular piece 52 has the same inner diameter as the tubular connector 26.

Figures 29, 30:
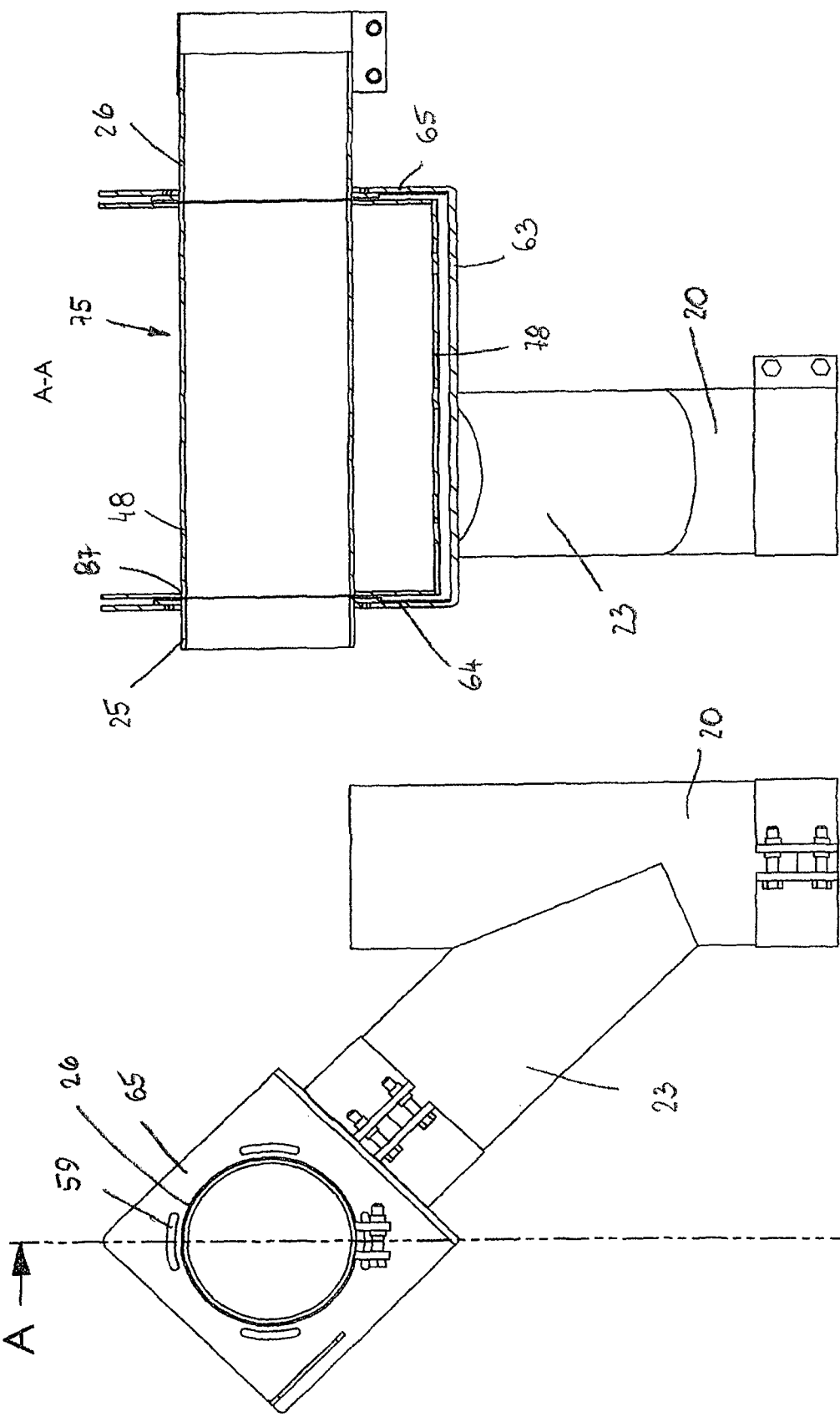
FIG. 29 in side view the module according to FIG. 22 with inserted second valve seat.
FIG. 30 a section along the line A-A in FIG. 29.
Figure 32:
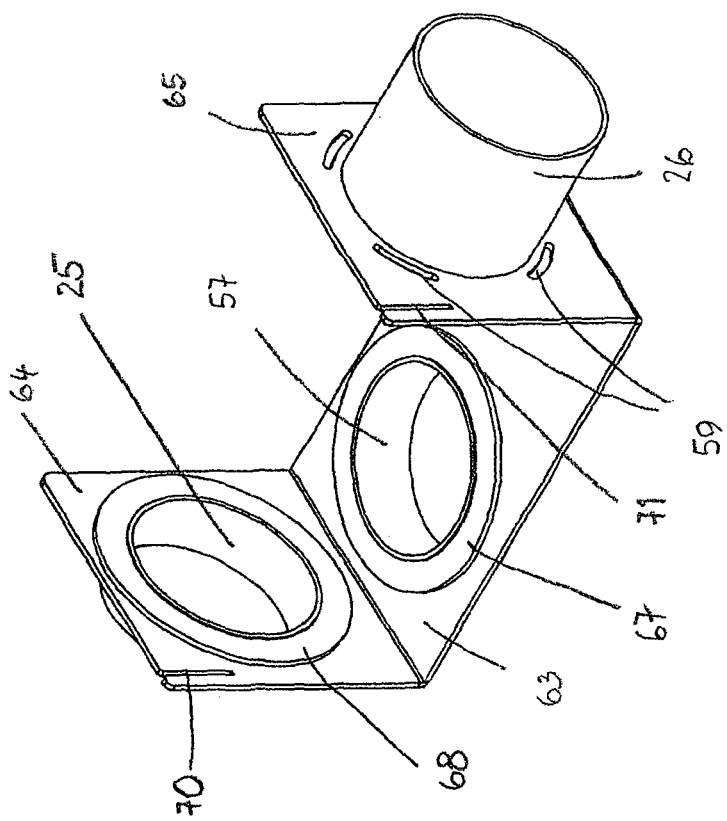
FIG. 32 the valve carrier according to FIG. 31 in perspective illustration.
Figure 31:
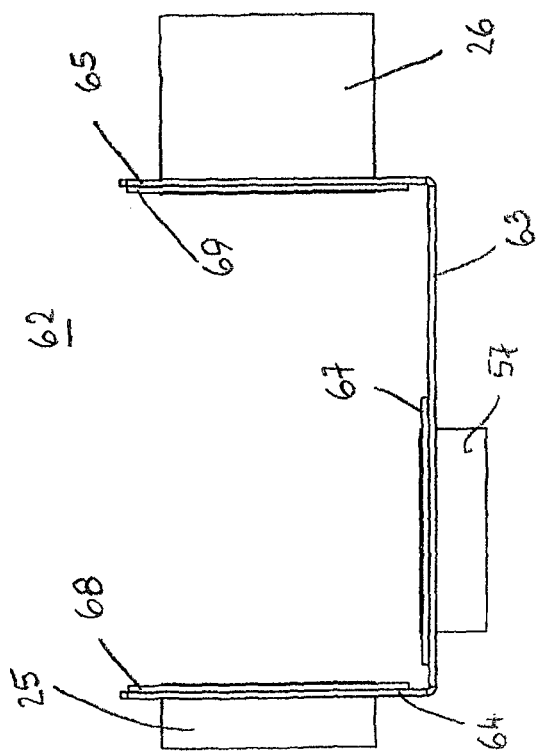
FIG. 31 in side view a valve carrier of the module according to FIG. 22.

The other sidewall 76 can be closed so that it closes off the tubular connector 25 of the valve carrier 62. In the embodiment, it has the through opening 87 (FIGS. 30 and 34).

As in the preceding embodiments, the tubular piece 52 has two tubular sections 53, 55 which are angularly positioned relative to each other. They each extend straight and adjoin each other at a right angle. The tubular section 53 is fastened in the described way in the through opening 82 of the sidewall 77.

The other tubular section 55 is fastened with its free end in a through opening 83 which is provided in the bottom 78. Like the tubular section 53, the tubular section 55 also does not project past the through opening 83. In accordance with the preceding embodiments, the tubular section 55 has the same inner diameter as the tubular connector 57 of the valve carrier 62.

The two tubular sections 53, 55 of the tubular piece 52 adjoin air-tightly the tubular connectors 26, 57, respectively. Sealing rings 67, 69 ensure the air-tight connection between the tubular connectors 26, 57 and the tubular sections 53, 55.

The sidewall 76 of the valve insert 74 is resting sealtightly against the sealing ring 68 of the tubular connector 25.

The tongues 80, 81 of the longitudinal wall 79 ensure that the valve insert 74 is held safely and reliably in the valve carrier 62. The valve insert 74 is designed such that the tubular sections 53, 55 adjoin air-tightly the tubular connectors 26, 57. The bulk goods are therefore reliably conveyed from the respective sender A to C to the respective consumer 1 to 4, as has been explained in connection with the preceding embodiments.

The valve insert 75 has the straight tubular piece 48 with which the two tubular connectors 25, 26 can be joined by a line connection to each other (FIGS. 30, 35, and 36). As in the preceding embodiments, the tubular piece 48 is of a straight configuration and extends between the two sidewalls 76, 77 with minimal spacing above the bottom 78 of the valve insert 75. The two ends of the tubular piece 48 are fastened in the through openings 82, 87 in the sidewalls 76, 77 in such a way that they do not project past the sidewalls.

In other respects, the valve insert 75 is of the same configuration as the valve insert 74.

In the installation position, the tubular piece 48 adjoins air-tightly the tubular connectors 25, 26 wherein the sealing rings 68, 69 (FIG. 31) provide the required sealing action. The bottom 78 of the valve insert 75 air-tightly closes off the tubular connector 57 in the base part 63 of the valve carrier 62. This is ensured by the sealing ring 67 against which the bottom 78 of the valve insert 75 rests air-tightly.

While in the preceding embodiments the two tubular pieces 48, 52 are provided in the valve slider 27, in the present embodiment the two tubular pieces 48, 52 are part of two valve inserts 74, 75 which can be inserted by the operator of the system selectively into the valve carrier 62. The function of the valve inserts 74, 75 corresponds in other respects to the function of the valve slider 27 so that reference is being had to the preceding embodiments in regard to this function.

The embodiment according to FIGS. 22 to 42 is characterized in that it can be produced extremely inexpensively.

FIGS. 43 to 47 show a further embodiment of a valve 13 of the module 19. It has the tubular connectors 25, 26, 57 which, in accordance with the preceding embodiment, are provided at the legs 64, 65 and at the base part 63 of the valve carrier 62. The valve carrier 62 is in principle of the same configuration as in the preceding embodiment. The two legs 64, 65 of the valve carrier 62 are connected to each other by a cover part 84 that is fastened to the end faces of the two legs 64, 65. The cover part 84 has, for example, a rectangular contour and projects past the two legs 64, 65 of the valve carrier 62 in its length direction as well as in its width direction.

The valve carrier 62 accommodates the valve slider 27 which comprises the bottom 43 that connects the two transverse walls 41, 42 to each other which are projecting transversely away from it. The free ends of the two transverse walls 41, 42 are connected by a cover 85 to each other that is located at a minimal spacing in the region below the cover part 84 of the valve carrier 62.

The bottom 43 and the transverse walls 41, 42 of the valve slider 27 are advantageously of a one-piece configuration. In this way, it is possible, for example, to bend these parts from a sheet metal piece.

In the transverse walls 41, 42 of the valve slider 27 the through openings 46, 47 are provided which are connected to each other by the tubular piece 48. In the region adjacent to the tubular piece 48, the angled tubular piece 52 is arranged that is also a component of the valve slider 27.

The valve slider 27 is suspended from the cover part 84 of the valve carrier 62. The cover part 84 is provided with a slot 86 (FIG. 44) that extends transversely to its longitudinal direction and through which a clamping part 88 projects which is held in the cover 85 of the valve slider 27. In the respective position, the valve slider 27 is clamped by means of the clamping part 88 at the valve carrier 62. The clamping part 88 is advantageously a clamping screw with a ball-shaped grip with which the clamping screw can be loosened for sliding the valve slider 27.

At the bottom side of the cover part 84, there are two guides 89, 90 that are positioned parallel to each other (FIG. 44) and extend perpendicularly to the longitudinal direction of the cover part 84 as well as parallel to the slot 86. The guides 89, 90 are provided at their side facing each other with grooves 91, 92 extending in their longitudinal direction in which the cover 85 engages with its projecting rim.

The clamping part 88 penetrates a marking tab 93 which extends in sliding direction of the valve slider 27 and is connected to the clamping part 88. With the aid of the marking tab 93 it can be determined easily in which position the valve slider 27 is located.

In the position illustrated in FIGS. 46, 47, the marking tab 93 projects past one longitudinal rim 94 of the cover part 84. This position of the marking tab 93 indicates that the tubular connector 26 is joined by a line connection via the tubular piece 52 to the tubular connector 57. The valve slider 27, as seen in plan view, projects past the longitudinal rim 94 of the cover part 84. In this position of the valve slider 27, the straight tubular piece 48 is positioned almost completely outside of the valve carrier 62.

The position of the valve slider 27 can be indicated visually by a corresponding marking 95 at the top side of the cover part 84 and the marking tab 93. As illustrated in FIGS. 46, 47, at the cover part 84 two marking strips 95a, 95b that are aligned with each other are provided as well as a marking strip 95c which is perpendicular thereto. At the top side of the marking tab 93 a marking strip 95d as well as a marking strip 95e are provided. The marking strip 95e is designed angularly and, in the position of the valve slider 27 illustrated in FIGS. 46, 47, connects the marking strips 95b with the marking strip 95c. In this way, the angled tubular piece 52 is symbolized at the top side of the cover part 84.

The tubular piece 52 is connected in the described way pressure-tightly and air-tightly to the tubular connectors 26, 27. As explained with the aid of the previous embodiments, in this position of the valve slider 27 the bulk goods are conveyed from the respective sender A to C to the respective consumer 1 through 4.

Figure 48:
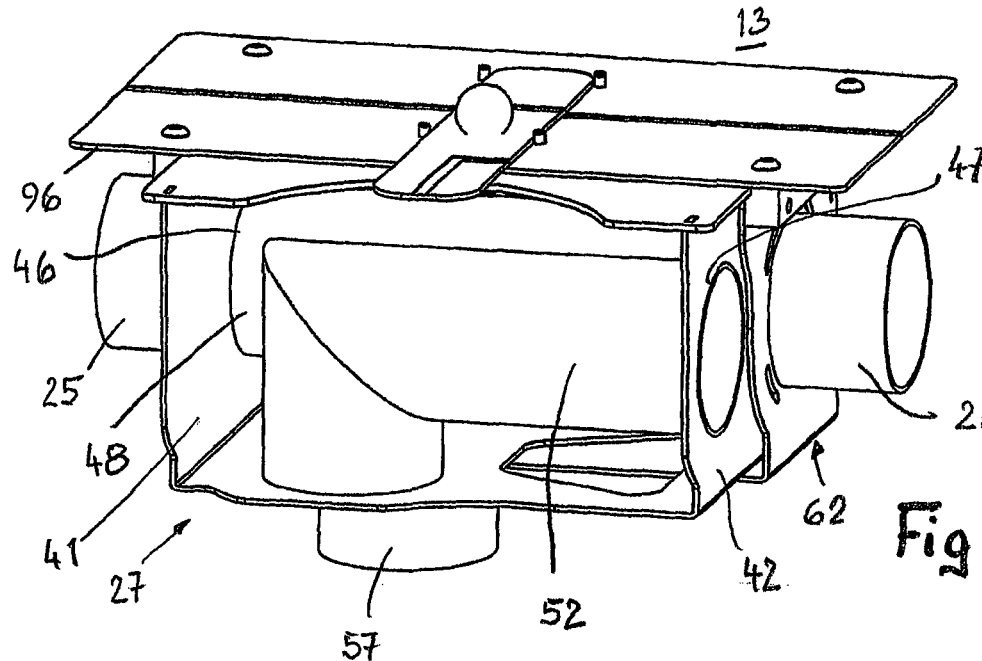
FIG. 48 the valve according to FIG. 47 with a different position of the valve slider.
Figure 49:
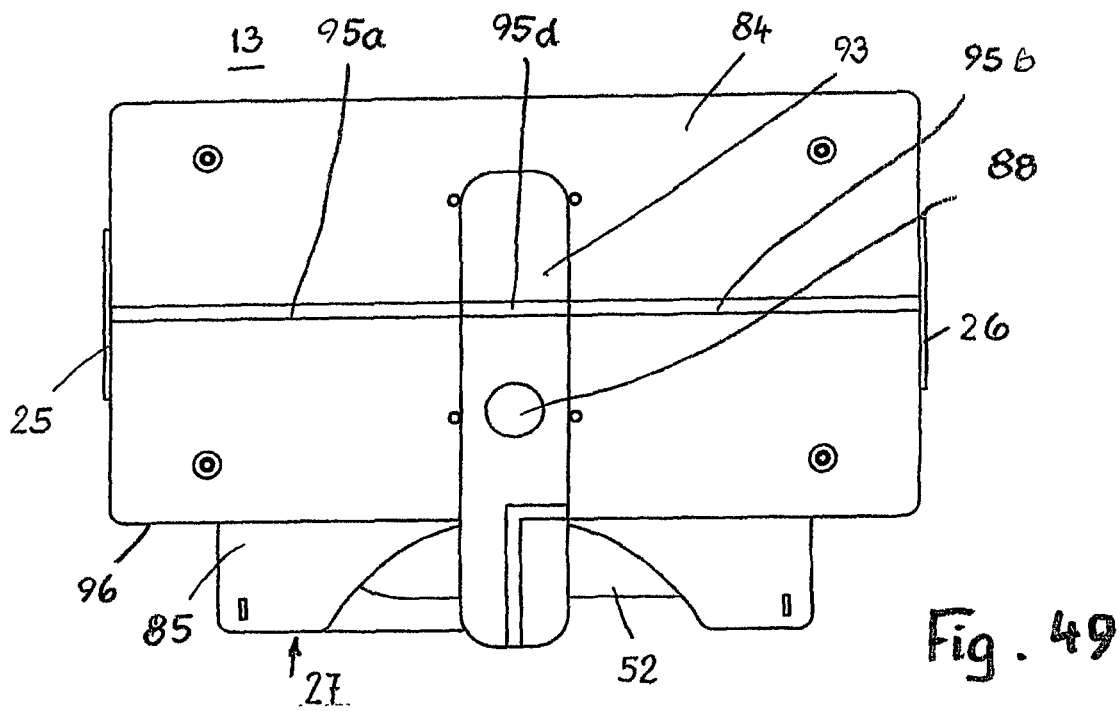
FIG. 49 a plan view of the valve according to FIG. 48.

FIGS. 48, 49 show the valve slider 27 in its other position in which the straight tubular piece 48 connects the two tubular connectors 25, 26 to each other in a pressure-tight or air-tight way. The valve slider 27 has been displaced by means of the clamping part 88 relative to the valve carrier 62. The cover 85 of the valve slider 27 projects past the longitudinal rim 96 of the cover part 84 in this case.

In this position of the valve slider 27, the marking strip 95d of the marking tab 93 connects the two marking strips 95a, 95b of the cover part 84 that are aligned with each other. In this way, it is visually indicated in an advantageous way that the two tubular connectors 25, 26 are connected to each other by the straight tubular piece 48. As already explained in connection with the preceding embodiments, no conveyance of bulk goods from the sender to the consumer takes place in this case. The tubular piece 48 has the same inner diameter as the tubular connectors 25, 26 so that the line passing through the valve 13 has a constant inner cross section. In the position of the valve slider 27 according to FIGS. 48, 49, the angled tubular piece 52 is without connection to the tubular connectors 25, 26.

By means of the clamping part 88, a simple adjustment of the valve slider 27 between the two positions is possible. In this context, it is advantageous when the slot 86 in the cover part 84 has such a length that the clamping part 88 penetrating this slot is stopped at the ends of the slot 86 in the respective position of the valve slider 27.

The valve slider 27 in this embodiment can also be displaced by a drive into the two positions, as has been explained in connection with the preceding embodiments in an exemplary fashion.

Figure 50:
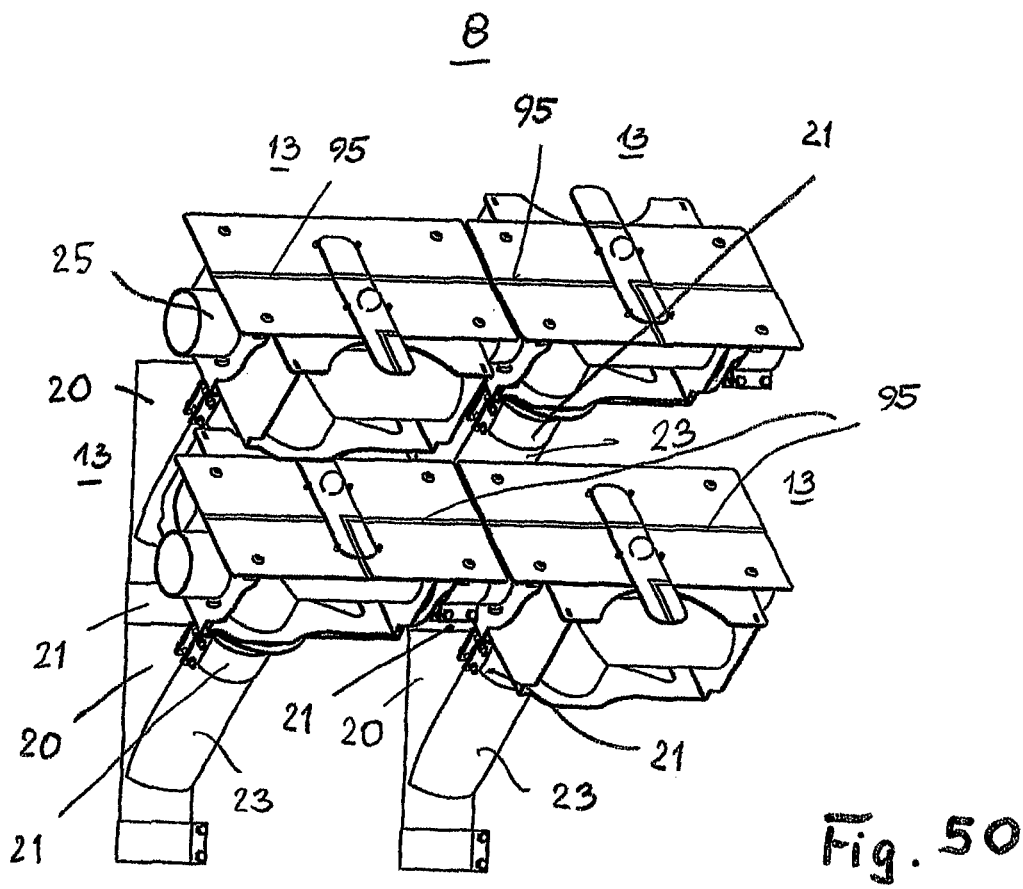
FIG. 50 in perspective illustration a part of a matrix station which is provided with the valves according to FIGS. 43 to 49.

FIG. 50 shows a part of the matrix station 8 in which the valves 13 according to FIGS. 43 to 49 are arranged. Their tubular connectors 57 are connected immediately to the tubular sections 23 which branch off the tubular sections 20 at an angle. The tubular sections 20 positioned above each are connected by coupling pieces 21 pressure-tightly in the described way. The tubular sections 23 are connected pressure-tightly by means of the coupling pieces 21 to the tubular sections 57.

The valve sliders of the valves 13 are adjusted differently so that the straight tubular piece 48 connects the tubular connectors 25, 26 (left upper valve and right lower valve) to each other and the angled tubular piece 52 connects the tubular connector 26 to the tubular connector 57 pressure-tightly (right upper valve and left lower valve 13). In this way, depending on the position of the valve slider 27, each one of the senders A to C can be connected to each one of the consumers 1 to 4, as has been disclosed in detail above.

FIG. 50 shows that, based on the marking 95, it is visually indicated which of the two pipe pieces 48, 52 is connected to the corresponding tubular connectors 25, 26, 57.

The embodiment according to FIGS. 43 to 50 is characterized by its compact configuration. As shown in FIG. 50, the individual valves 13 or the modules 19 can be arranged closely adjacent and above each other so that the matrix station 8 requires only little space. The matrix station 8 forms a type of control panel where the operator can simply move by hand the valve slider 27 into the required position by means of the respective clamping part 88. By a sliding movement, the operator can close off the connection from the sender to the receiver. In this way, the corresponding module is switched automatically to emptying by suction. In the next conveying process after the sliding process, the emptying-by-suction action of the line sections connected by means of the straight tubular pieces 48 is taking place automatically.

When new material is to be supplied to the consumer 1 to 4 (FIG. 1), the respective valve slider is displaced by means of the clamping part 88 such that the angled tubular piece 52 connects the tubular connectors 26, 57 to each other.

Figure 51:
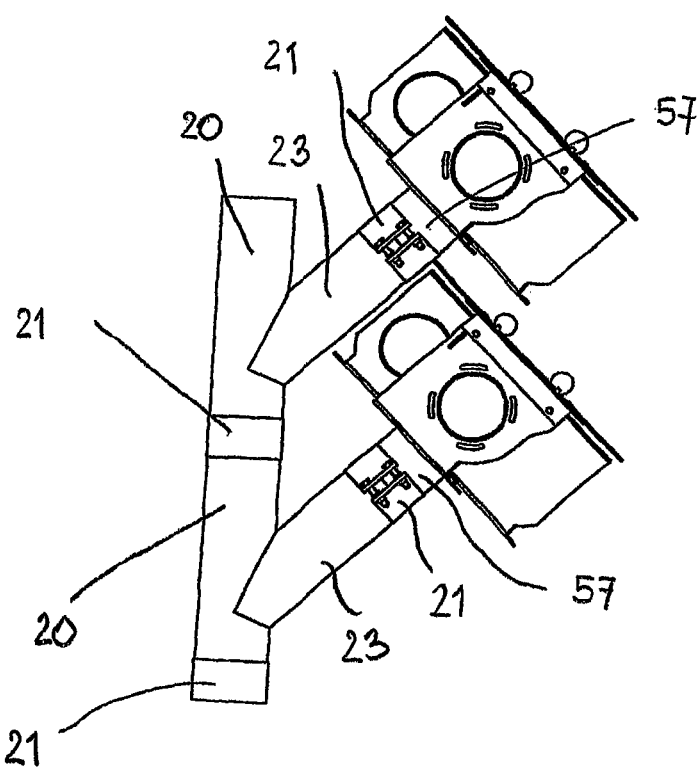
FIG. 51 a side view of the matrix station according to FIG. 50.

As can be seen in FIG. 50, the matrix station 8 can be constructed by means of the modules 19 of this embodiment in such a way that the matrix station can be preferably mounted on a wall. The branched-off tubular sections 23, beginning at the vertical tubular sections 20, are oriented toward one side. The valves 13 of the modules 19 are configured in this context such that they do not project past the plane containing the vertical tubular sections 20 (FIG. 51).

The matrix station 8 can be expanded easily by means of the modules 19. Also, a reconfiguration of the matrix station is possible in a simple way. Moreover, the matrix station 8 is inexpensive in regard to manufacture and assembly. Emptying by suction is realized optimally when the straight tubular piece 48 is connected to the tubular connectors 25, 26 and the next conveying process is taking place.

What is claimed is:

1. A module for a conveyor system for bulk goods, the module comprising:
   a first tubular section;
   a second tubular section branching off the first tubular section and provided with a coupling piece;
   a valve connected by the coupling piece to the second tubular section, the valve comprising a first connector, a second connector, and a third connector;
   wherein the first connector is connected in flow communication to the second tubular section;
   wherein the second connector is selectively connectable via a first line with the first connector and via a second line with the third connector;
   wherein the valve comprises a parallelepipedal housing and a valve slider slidably supported in the parallelepipedal housing, wherein the first line and the second line are disposed in the valve slider;
   wherein the parallelepipedal housing of the valve comprises two sidewalls positioned opposite each other and a bottom connecting the two sidewalls, wherein the second and third connectors are arranged at the two sidewalls of the parallelepipedal housing, and wherein the first connector is arranged at the bottom of the parallelepipedal housing;

wherein the valve slider comprises a parallelepipedal frame comprising two opposed sides, wherein the two opposed sides each comprise a through opening, and wherein the second line connects the through openings to each other.

2. The module according to claim 1, wherein the first and second connectors are arranged angularly relative to each other.

3. The module according to claim 1, wherein the second and third connectors are positioned opposite each other.

4. The module according to claim 1, wherein the first line and the second line are tubular pieces.

5. The module according to claim 1, wherein the first, second and third connectors are tubular sections.

6. The module according to claim 1, wherein the valve slider comprises a bottom connecting the two opposed sides.

7. The module according to claim 1, wherein the through openings are surrounded by venting openings.

8. A module according to claim 1, for a conveyor system for bulk goods, the module comprising:
a first tubular section;
a second tubular section branching off the first tubular section and provided with a coupling piece;
a valve adjoining the second tubular section and comprising a first connector, a second connector, and a third connector;
wherein the first connector is connected in flow communication to the second tubular section;
wherein the second connector is selectively connectable via a first line with the first connector and via a second line with the third connector;
wherein the valve comprises a valve carrier, a first valve insert, and a second valve insert, wherein the first and second valve inserts are alternately insertable into the valve carrier, wherein the first line is disposed in the first valve insert and the second line is disposed in the second valve insert.

9. The module according to claim 8, wherein the valve carrier comprises two sidewalls that are positioned opposite each other and further comprises a bottom connecting the two sidewalls.

10. The module according to claim 9, wherein the first connector is disposed in the bottom of the valve carrier and the second and third connectors are disposed in the two sidewalls of the valve carrier.

11. The module according to claim 8, wherein the first and second valve inserts each comprise a bottom and two sidewalls, wherein the two sidewalls are positioned opposite each other.

12. The module according to claim 11, wherein the first line comprises a first end and a second end, wherein the first end is fastened in a through opening of one of the two sidewalls of the first valve insert, and the second end is fastened in a through opening of the bottom of the first valve insert.

13. The module according to claim 11, wherein the second line comprises a first end and a second end opposite the first end, wherein the first and second ends are fastened in through openings provided in the two sidewalls of the second valve insert.

14. The module according to claim 8, wherein the first and second valve inserts each comprise at least one fastening part.

15. The module according to claim 14, wherein the at least one fastening part is a plug-in part insertable into a plug-in opening of the valve carrier.

16. A conveyor system for bulk goods, the conveyor system comprising:
a matrix station comprised of modules, wherein the modules each comprise:
a first tubular section;
a second tubular section branching off the first tubular section and provided with a coupling piece;
a valve connected by the coupling piece to the second tubular section, the valve comprising a first connector, a second connector, and a third connector;
wherein the first connector is connected in flow communication to the second tubular section;
wherein the second connector is selectively connectable via a first line with the first connector and via a second line with the third connector;
wherein the valve comprises a parallelepipedal housing and a valve slider slidably supported in the parallelepipedal housing, wherein the first line and the second line are disposed in the valve slider;
wherein the parallelepipedal housing of the valve comprises two sidewalls positioned opposite each other and a bottom connecting the two sidewalls, wherein the second and third connectors are arranged at the two sidewalls of the parallelepipedal housing, and wherein the first connector is arranged at the bottom of the parallelepipedal housing;
wherein the valve slider comprises a parallelepipedal frame comprising two opposed sides, wherein the two opposed sides each comprise a through opening, and wherein the second line connects the through openings to each other;
two or more senders;
at least one consumer;
wherein the two or more senders are connectable by a line connection via the matrix station to the at least one consumer.

17. The conveyor system according to claim 16, wherein the valves of the two or more modules are connected in flow communication to each other via the second and third connectors, respectively.

18. The conveyor system according to claim 16, further comprising a check valve closing toward the matrix station and seated in the line connection between the matrix station and the at least one consumer.

19. A conveyor system for bulk goods, the conveyor system comprising:
a matrix station comprising a module according to claim 8;
two or more senders;
at least one consumer;
wherein the two or more senders are connectable by a line connection via the matrix station to the at least one consumer.

* * * * *